US010999043B2

(12) United States Patent
Beale et al.

(10) Patent No.: US 10,999,043 B2
(45) Date of Patent: May 4, 2021

(54) INFRASTRUCTURE EQUIPMENT, COMMUNICATIONS DEVICES AND METHODS FOR COMPENSATING FOR FREQUENCY DRIFT OF AN OSCILLATOR OF A COMMUNICATIONS DEVICE

(71) Applicants: SONY CORPORATION, Tokyo (JP); SONY MOBILE COMMUNICATIONS, INC., Tokyo (JP)

(72) Inventors: Martin Warwick Beale, Basingstoke (GB); Shin Horng Wong, Basingstoke (GB); Basuki Priyanto, Lund (SE)

(73) Assignees: SONY CORPORATION, Tokyo (JP); SONY MOBILE COMMUNICATIONS, INC., Tokyo (JP)

(*) Notice: Subject to any disclaimer, the term of this patent is extended or adjusted under 35 U.S.C. 154(b) by 187 days.

(21) Appl. No.: 15/654,611

(22) Filed: Jul. 19, 2017

(65) Prior Publication Data

US 2017/0317806 A1    Nov. 2, 2017

Related U.S. Application Data

(63) Continuation of application No. PCT/EP2017/055581, filed on Mar. 9, 2017.

(30) Foreign Application Priority Data

Mar. 15, 2016 (EP) ..................................... 16160533
Apr. 5, 2016 (EP) ..................................... 16163943
May 26, 2016 (EP) ..................................... 16171552

(51) Int. Cl.
*H04L 5/00* (2006.01)
*H04L 27/00* (2006.01)
(Continued)

(52) U.S. Cl.
CPC .......... *H04L 5/0064* (2013.01); *H04L 5/0096* (2013.01); *H04L 27/0012* (2013.01);
(Continued)

(58) Field of Classification Search
CPC . H04L 5/0064; H04L 5/0096; H04L 27/0012; H04L 1/1607; H04L 5/0023;
(Continued)

(56) References Cited

U.S. PATENT DOCUMENTS

2007/0147436 A1    6/2007 Zumsteg
2008/0144486 A1    6/2008 Wilhelmsson et al.
(Continued)

FOREIGN PATENT DOCUMENTS

EP         1 713 223 A2    10/2006
WO    WO 2015/192885 A1    12/2015

OTHER PUBLICATIONS

International Search Report dated Jul. 20, 2017 in PCT/EP2017/055581.
(Continued)

*Primary Examiner* — Feben Haile
(74) *Attorney, Agent, or Firm* — Xsensus LLP

(57) ABSTRACT

A communication device includes a receiver, a transmitter and a control circuit. The receiver is configured to receive, from an infrastructure equipment of a mobile communications network, downlink signals on a downlink via a wireless access interface of the mobile communications network. The transmitter is configured to transmit, to the infrastructure equipment, uplink signals on an uplink via the wireless access interface. The control circuit is configured to control the receiver to receive the downlink signals and control the transmitter to transmit the uplink signals. The control circuit is further configured to delay a reception period for the receiver to receive the downlink signals after a transmission
(Continued)

period in which the transmitter transmits the uplink signals when a duration of the transmission period exceeds a predetermined threshold.

18 Claims, 9 Drawing Sheets

(51) Int. Cl.
 *H04W 48/10* (2009.01)
 *H04W 72/04* (2009.01)
 *H04L 1/16* (2006.01)
 *H04L 1/18* (2006.01)
(52) U.S. Cl.
 CPC ....... *H04W 48/10* (2013.01); *H04W 72/0406* (2013.01); *H04L 1/1607* (2013.01); *H04L 1/1812* (2013.01); *H04L 5/0023* (2013.01)
(58) Field of Classification Search
 CPC .. H04L 1/1812; H04W 72/0406; H04W 48/10
 See application file for complete search history.

(56) References Cited

U.S. PATENT DOCUMENTS

| | | | | |
|---|---|---|---|---|
| 2008/0212563 | A1* | 9/2008 | Birru | H04B 1/71632 370/350 |
| 2009/0267591 | A1 | 10/2009 | Roberts | |
| 2014/0029586 | A1* | 1/2014 | Loehr | H04W 56/0005 370/336 |
| 2014/0369242 | A1* | 12/2014 | Ng | H04W 72/0453 370/280 |
| 2015/0156793 | A1* | 6/2015 | Dai | H04W 72/1242 370/329 |
| 2015/0172022 | A1* | 6/2015 | Guo | H04L 5/0053 370/329 |
| 2016/0182388 | A1* | 6/2016 | Tsuruoka | H04L 47/283 370/315 |
| 2017/0149552 | A1 | 5/2017 | Vejlgaard et al. | |
| 2017/0373907 | A1* | 12/2017 | Tan | H04L 5/0091 |
| 2020/0396045 | A1* | 12/2020 | Wang | H04L 5/1469 |

OTHER PUBLICATIONS

International Search Report dated Jun. 7, 2017 in PCT/EP2014/055581 filed Mar. 9, 2017.
Harris Holma, et al. "LTE for UMTS: OFDMA and SC-FDMA Based Radio Access" System Architecture Based on 3GPP SAE, Wiley 2009, 4 Pages.
"New Work Item: NarrowBand IOT (NB-IOT)" Qualcomm Incorporated, 3GPP TSG RAN Meeting #69, RP-151621, Sep. 2015, 9 Pages.
"Way Forward on NB-IoT" CMCC, Vodafone, Ericsson, Huawei, HiSilicon, Deutsche Telekom, Mediatek, Qualcomm, Nokia Networks, Samsung, Intel, Neul, CATR, AT&T, NTT DOCOMO, ZTE, Telecom Italia, IITH, CEWiT, Reliance-Jio, CATT, u-blox, China Unicom, LG Electronics, Panasonic, Alcatel-Lucent, Alcatel-Lucent Shanghai Bell, China Telecom, 3GPP TSG RAN WG1 #83, R1-157783, Nov. 2015, 3 Pages.
"3$^{rd}$ Generation Partnership Project: Technical Specification Group GSM.EDGE Radio Access Network; Cellular system support for ultra-low complexity and low throughput Internet of Things (CIoT)" 3GPP Organizational Partners, V13.1.0, 3GPP TR 45.820, Nov. 2015, 495 Pages.

* cited by examiner

INFRASTRUCTURE EQUIPMENT, COMMUNICATIONS DEVICES AND METHODS FOR COMPENSATING FOR FREQUENCY DRIFT OF AN OSCILLATOR OF A COMMUNICATIONS DEVICE

CROSS-REFERENCE TO RELATED APPLICATIONS

This application is a bypass continuation application of PCT/EP2017/055581, filed Mar. 9, 2017, which claims priority to European patent application EP16160533.2, filed Mar. 15, 2016, European patent application EP16163943.0, filed Apr. 5, 2016, and European a patent application EP16171552.9, filed May 26, 2016, the entire contents of each of which is hereby incorporated by reference.

BACKGROUND

Technical Field

The present disclosure relates to infrastructure equipment which are configured to receive signals from communications devices which may suffer from frequency drift during long transmissions, as well as communications devices and methods for the same. The present disclosure provides embodiments relating to frequency offset indication, embodiments relating to frequency offset tolerance in order to address the issue of frequency drift, and embodiment relating to transmission control at the communications devices.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Third and fourth generation wireless communications systems, such as those based on the third generation partnership project (3GPP) defined UMTS and Long Term Evolution (LTE) architecture are able to support sophisticated services such as instant messaging, video calls as well as high speed internet access. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication (MTC) devices, devices which require little or no mobility, high resolution video displays and virtual reality headsets. As such, supporting such a wide range of communications devices can represent a technical challenge for a wireless communications network.

A current technical area of interest to those working in the field of wireless and mobile communications is known as "The Internet of Things" or IoT for short. The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network. Furthermore such NB-IoT devices are likely to be deployed indoors and/or in remote locations making radio communications challenging.

SUMMARY

According to one example embodiment of the present technique an infrastructure equipment, which forms part of a mobile communications network configured to transmit signals to and receive signals from one or more communications devices, comprises a receiver configured to receive signals on the uplink from the one or more communications devices via a wireless access interface of the mobile communications network, a transmitter configured to transmit signals on the downlink to the one or more communications devices via the wireless access interface, and a controller configured to control the receiver to receive the signals and to control the transmitter to transmit the signals. The controller is configured in combination with the receiver and the transmitter to measure a frequency error of signals received from one of the communications devices, the frequency error being an amount by which a carrier frequency of the received signals differs from a predetermined frequency, and to transmit, in one or more temporal periods, during which reception of the signals transmitted by and received from the one of the communications devices is paused, a frequency correction signal to the one of the communications devices, the frequency correction signal providing an indication of a correction to compensate for the measured frequency error.

According to another example embodiment of the present technique an infrastructure equipment, which forms part of a mobile communications network configured to transmit signals to and receive signals from one or more communications devices, comprises a receiver configured to receive signals on the uplink from the one or more communications devices via a wireless access interface of the mobile communications network, a transmitter configured to transmit signals on the downlink to the one or more communications devices via the wireless access interface, and a controller configured to control the receiver to receive the signals and to control the transmitter to transmit the signals. The controller is configured in combination with the receiver and the transmitter to determine whether a duration of reception of signals from one of the communications devices exceeds a predetermined threshold, and if so subsequently to delay transmission of signals to the one of the communications devices for a predetermined period following the reception of the signals from the one of the communications devices. In this second example embodiment, the infrastructure equipment is alternatively configured, during the predetermined period, to transmit a command to the one of the communications devices at a frequency shifted from a preconfigured frequency of transmission of the infrastructure equipment by an amount equal to a frequency error of the one of the communications devices, the command indicating to the one of the communications devices that the frequency of transmissions of the one of the communications devices should be corrected by an amount equal and opposite to the frequency error.

According to yet another example embodiment of the present technique an infrastructure equipment, which forms part of a mobile communications network configured to transmit signals to and receive signals from one or more communications devices, comprises a receiver configured to receive signals on the uplink from the one or more communications devices via a wireless access interface of the mobile communications network, a transmitter configured to transmit signals on the downlink to the one or more communications devices via the wireless access interface, and a controller configured to control the receiver to receive the signals and to control the transmitter to transmit the signals. The controller is configured in combination with the receiver and the transmitter to receive uplink signals transmitted from one of the communications devices in a plurality of transmission periods, each of the plurality of transmission periods being separated from a next transmission by a first predetermined period in which the one of the communications devices receives downlink signals from the infrastructure equipment to correct a transmission frequency with respect to a carrier frequency of allocated communications resources. After a last of the transmission periods in which the uplink signals are received from the one of the communications devices, the controller is configured in combination with the receiver and the transmitter to determine whether the duration of reception of the signals from the one of the communications devices in the last of the transmission periods exceeded a predetermined threshold, and if so to control the transmitter to delay transmission of signals to the one of the communications devices for a second predetermined period following the reception of the signals from the one of the communications devices.

According to yet a further example embodiment of the present technique there is provided a communications device configured to transmit signals to and receive signals from an infrastructure equipment forming part of a mobile communications network. The communications device comprises a receiver configured to receive signals on the downlink from the infrastructure equipment via a wireless access interface of the mobile communications network, a transmitter configured to transmit signals on the uplink to the infrastructure equipment via the wireless access interface, a controller configured to control the receiver to receive the signals and to control the transmitter to transmit the signals, and a reference frequency source configured to control an output frequency of the signals transmitted by the transmitter. The controller is configured in combination with the receiver, the transmitter and the reference frequency source to receive from the infrastructure equipment an indication of communications resources in which the transmitter can transmit signals to the infrastructure equipment, to determine whether a period required to transmit an uplink transmission to the infrastructure equipment in the indicated communications resources exceeds a predetermined threshold, and if so, subsequently to control the transmitter not to signals to the infrastructure equipment using the indicated communications resources. The communications device may then be configured to search for a second infrastructure equipment to which the uplink transmission can be transmitted, and to control the transmitter to transmit signals to the second infrastructure equipment on second communications resources indicated by the second infrastructure equipment rather than using the indicated communications resources of the first infrastructure equipment.

Embodiments of the present technique can provide arrangements in which a frequency drift of an oscillator of a communications device, which is used as a reference for generating transmitted signals, may be compensated for at an infrastructure equipment which receives signals from the communications device, either by transmitting an indication of the frequency error to the communications device or by tolerating the frequency offset in received messages until such a point at which the frequency offset of communications device is able to be corrected. As such, the communications device can be manufactured at lower cost, using a lower cost and less accurate oscillator. This is particularly because, in some examples, a communications device operating with a narrow frequency bandwidth may transmit data over a longer time period which may cause the frequency drift of the oscillator to affect reception of the signals received by an infrastructure equipment of the wireless communications network.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE DRAWINGS

Conventional Communications System

Figure 1:
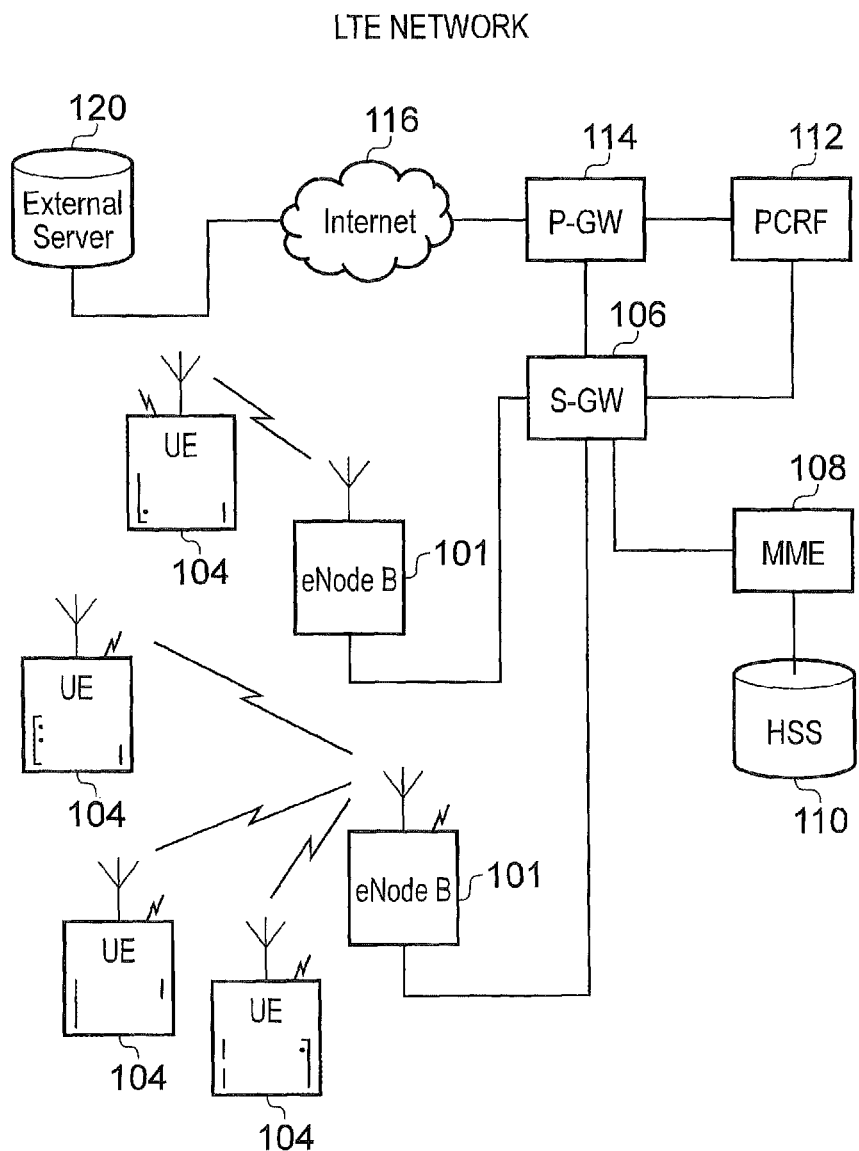
FIG. 1 is a schematic block diagram illustrating an example of a mobile telecommunication system.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards.

The mobile telecommunications system, where the system shown in FIG. 1 includes infrastructure equipment including base stations 101. The infrastructure equipment 101 may also be referred to as a base station, network element, enhanced NodeB (eNodeB (eNB)) or a coordinating entity for example, and provides a wireless access interface to the one or more communications devices within a coverage area or cell represented by a broken line 103. One or more mobile communications devices 104 may communicate data via the transmission and reception of signals representing data using the wireless access interface. The core network 102 may also provide functionality including authentication, mobility management, charging and so on for the communications devices served by the network entity.

The mobile communications devices 104 of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links.

As shown in FIG. 1 eNodeBs 101 are connected to a serving gateway S-GW 106 which is arranged to perform routing and management of mobile communications services to the communications devices 104 as they roam throughout the mobile radio network. In order to maintain mobility management and connectivity, a mobility management entity (MME) 108 manages the enhanced packet service (EPS) connections with the communications devices 104 using subscriber information stored in a home subscriber server (HSS) 110. Other core network components include the policy charging and resource function (PCRF) 112 a packet data gateway (P-GW) 114 which connects to an internet network 116 and finally to an external server 120.

LTE Wireless Access Interface

Mobile communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Figure 2:
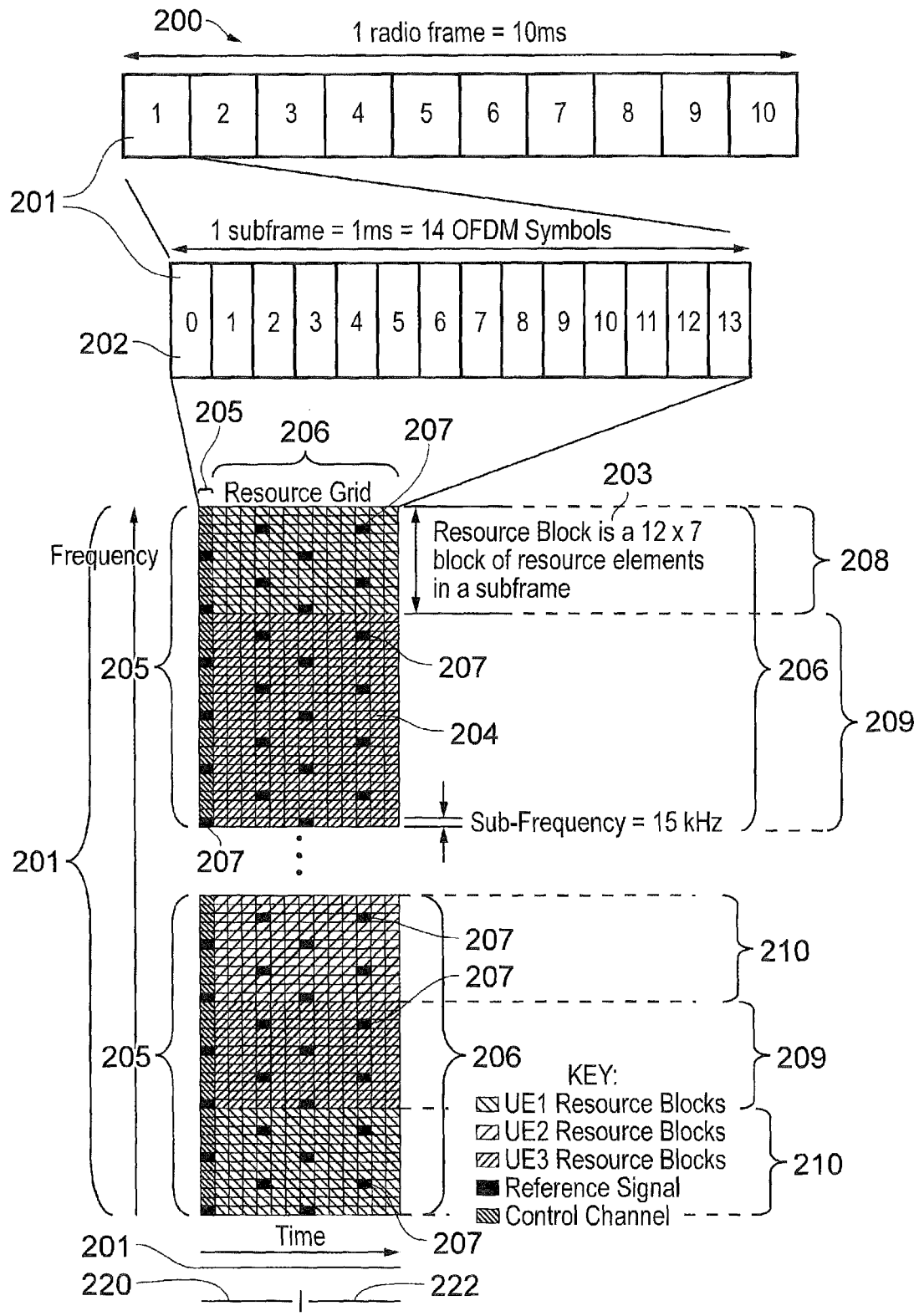
FIG. 2 is a schematic representation illustrating a frame structure of a downlink of a wireless access interface according to an LTE standard.

FIG. 2 provides a simplified schematic diagram of the structure of a downlink of a wireless access interface that may be provided by or in association with the eNB of FIG. 1 when the communications system is operating in accordance with the LTE standard. In LTE systems the wireless access interface of the downlink from an eNB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHz and 20 MHz bandwidth may be divided into 128 to 2048 orthogonal subcarriers for example. Each subcarrier bandwidth may take any value but in LTE it is conventionally fixed at 15 kHz. However it has been proposed in the future [2][3] to provide also a reduced subcarrier spacing of 3.75 kHz for certain parts of the LTE wireless access interface for the uplink. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. More details of the downlink structure of the LTE wireless access interface are provided in Annex 1.

Figure 3:
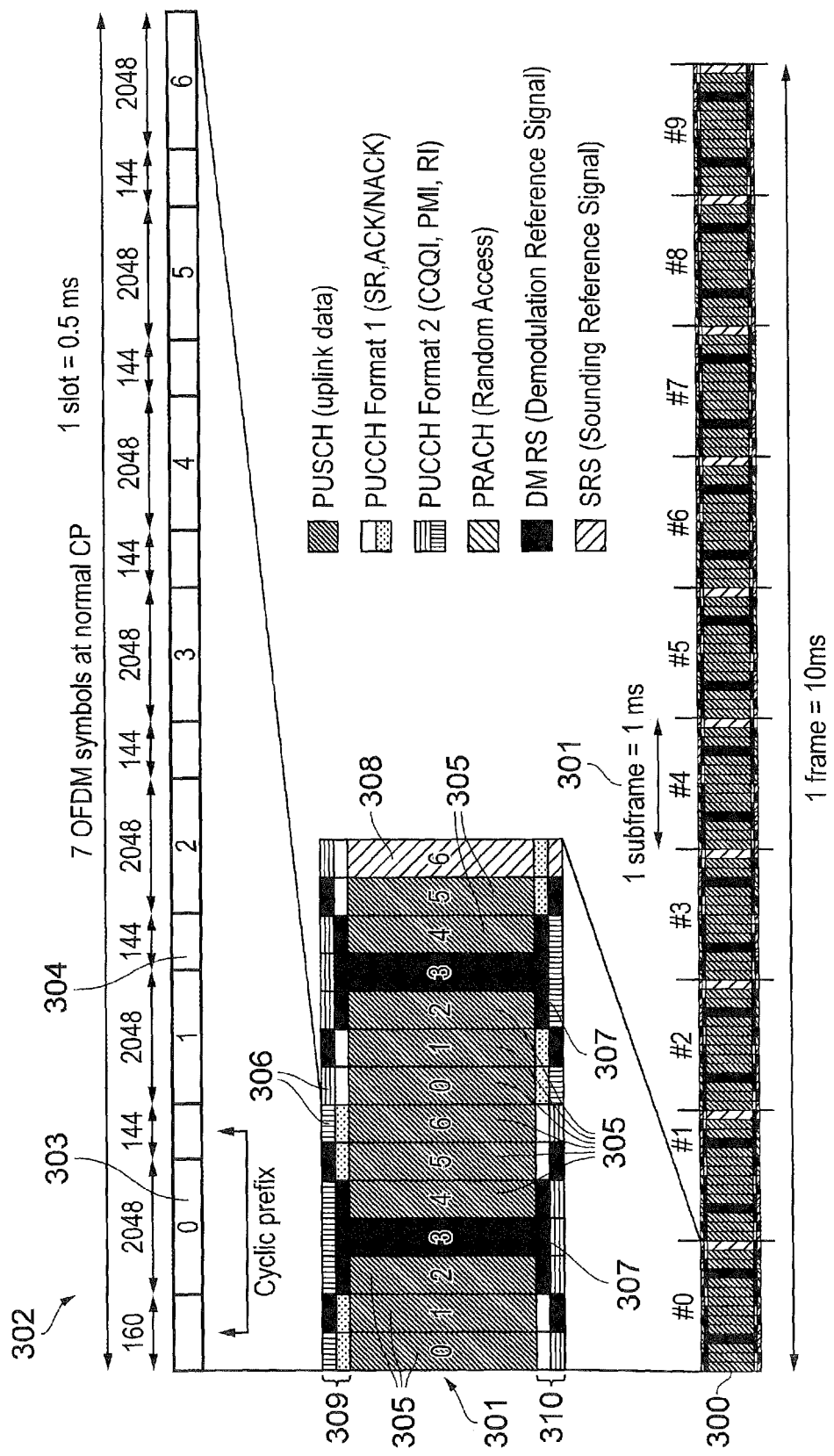
FIG. 3 is a schematic representation illustrating a frame structure of an uplink of wireless access interface according to an LTE standard.

FIG. 3 provides a simplified schematic diagram of the structure of an uplink of an LTE wireless access interface that may be provided by or in association with the eNB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes. More details of the LTE uplink represented in FIG. 3 are provided in Annex 1.

Narrowband Internet of Things and Machine Type Communications

As explained above, it has been proposed to develop an adaptation of a mobile communications network to accommodate narrow band communications within an existing wireless access interface which has been developed to provide broadband wireless communications. For example, in 3GPP a project relating to improvements to LTE wireless access interfaces to provide for a Narrowband Internet of Things (NB-IoT) was agreed [2]. This project is aimed at improved indoor coverage, support for massive number of low throughput devices, low delay sensitivity, ultra-low device cost, low device power consumption and (optimised) network architecture. An example of such a device is a smart meter. It has been proposed that an NB-IoT communications system supports a bandwidth of only 180 kHz and can have three operational modes:
1. 'Stand-alone operation' utilising for example the spectrum currently being used by GERAN systems as a replacement of one or more GSM carriers
2. 'Guard band operation' utilising the unused resource blocks within a LTE carrier's guard-band
3. 'In-band operation' utilising resource blocks within a normal LTE carrier One of the objectives of NB-IoT is to allow the cost of devices to be as low as possible. This is also an objective of Low Complexity Machine Type Communication (LC-MTC). LC-MTC terminal devices (UEs) also implement new LTE features which are currently being specified in 3GPP. The main features of LC-MTC UE are low complexity (and therefore low cost), coverage enhancement and reduced power consumption.

Figure 4:
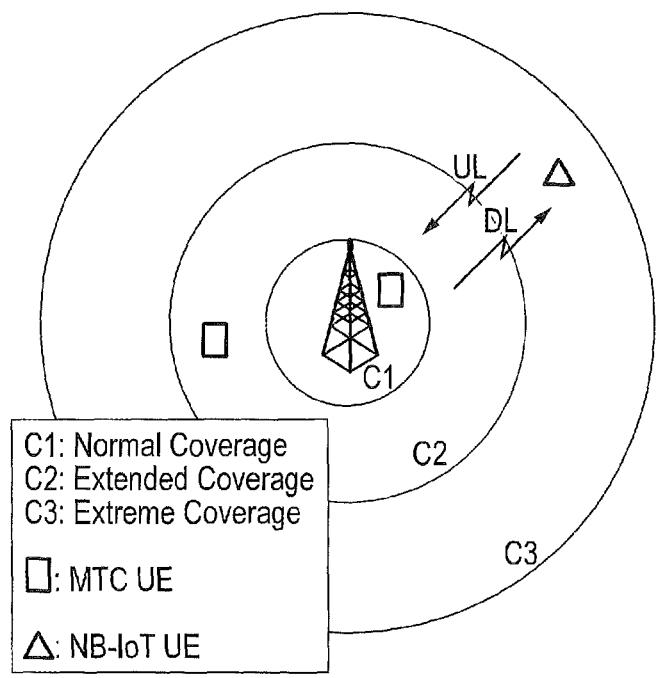
FIG. 4 illustrates MTC and NB-IoT UE operation in various modes of coverage.

FIG. 4 illustrates MTC and NB-IoT operation in various modes of coverage. As seen in FIG. 4, an infrastructure equipment sits inside the centre-most of three concentric rings of coverage. These coverage areas are, from the centre-most and smallest, area C1 (normal coverage), area C2 (extended coverage) and area C3 (extreme coverage). As can be seen in FIG. 4, MTC-UE devices are able to operate in both normal and extended coverage modes (C1 and C2) but not in extreme coverage mode (C3). NB-IoT UEs are able to operate in normal, extended and extreme coverage modes (C1, C2 and C3).

Employment of Low-Cost Oscillators

NB-IoT UEs are expected to use low cost oscillators (e.g. Digital Controlled Crystal Oscillators (DCXOs) or free-running crystal oscillators (XOs)) in order to reduce the cost. However, such components are expected to have more imperfections than more accurate and costly oscillators. In particular, such oscillators may lack frequency stability over changes in temperature.

NB-IoT UEs can be operated in normal coverage, extended coverage, and extreme coverage, as depicted in FIG. 4 and described above. In the extreme coverage enhancement case (20 dB coverage enhancement), NB-IoT UEs can support a data rate of 300 bps or greater. In the GERAN study (as detailed in 3GPP TR45.820), a mobile autonomous reporting (MAR) application has a packet size of up to 200 bytes. The application layer packet of 200 bytes can be segmented into smaller packets. If a maximum transport block size (TBS) of 1000 bits in the uplink and 300 bps data rate are assumed then it will take around 3.3 seconds to transmit each transport block. Such a condition sets a challenge for meeting a very low frequency error target of ±0.1 ppm as defined in the 3GPP specifications, since the frequency stability of the oscillator needs to be sufficient to meet this ±0.1 ppm requirement without correction from other parts of the UE signal processing functions. Large frequency errors can be introduced by the temperature change caused by, for example, power amplifier self-heating during long continuous transmissions. Large frequency error can introduce inter-carrier interference (ICI) at the receiver (eNodeB) and can significantly degrade the link quality performance (e.g. throughput).

There are various models for the frequency of the signal produced by a free running local oscillator. A simple model is described in equation (1) below:

$$f_{osc} = f_{init} + f_{drift}(t-t_0) \quad (1)$$

where $f_{osc}$ is the output frequency of the local oscillator, $f_{init}$ is the initial frequency of the local oscillator at time $t_0$, $f_{drift}$ is the frequency drift rate (measured in Hz/second) and t is the time. In an LTE modem, the initial frequency can be determined by, for example, monitoring the synchronisation and reference signals transmitted in the LTE downlink.

In a full-duplex FDD modem, the UE can continuously monitor the local oscillator frequency error (for example, through monitoring synchronisation and reference signals). Hence the term '$t-t_0$' never grows large, even in the presence of frequency drift.

In a half-duplex (HD) FDD modem however, the UE is unable to monitor the synchronisation and reference signals while it is transmitting in the uplink. Hence the term '$t-t_0$' can increase, causing a significant difference between the local oscillator frequency at the UE and the frequency at the eNodeB. This effect is shown in FIG. 5.

Figure 5:
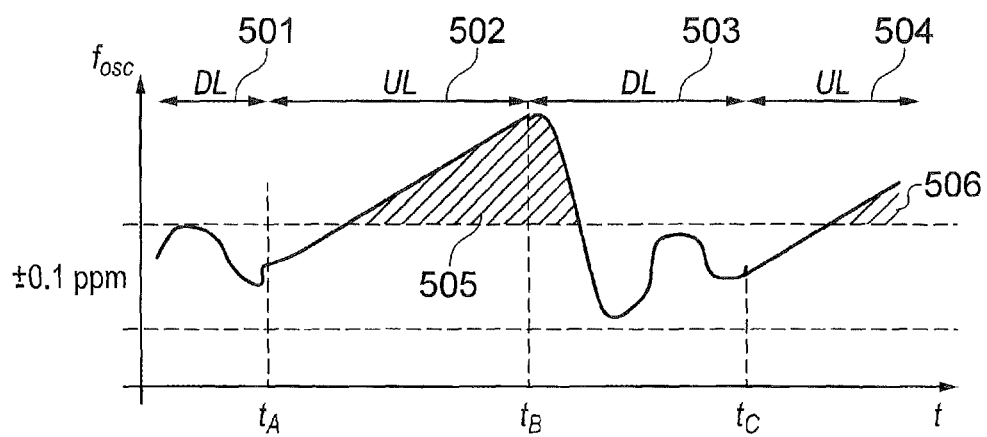
FIG. 5 illustrates an example of a local oscillator frequency as a function of time for an HD-FDD UE.

FIG. 5 illustrates an example of a local oscillator frequency as a function of time for an HD-FDD UE. As can be seen, during the periods when the UE is operating in the downlink (time period 501 up to $t_A$ and time period 503 between $t_B$ and $t_C$), the UE is able to correct its local oscillator frequency, keeping it within an acceptable range (e.g. ±0.1 ppm). However, when the UE is transmitting in the uplink, it is unable to correct its local oscillator frequency and that frequency hence drifts (at a rate of $f_{drift}$). Such periods are shown between times $t_A$ and $t_B$ (time period 502) and from time $t_C$ (time period 504). During these time periods 502 and 504, the frequency drift becomes greater than the error requirement of ±0.1 ppm, as can be seen in shaded regions 505 and 506.

Figure 6:
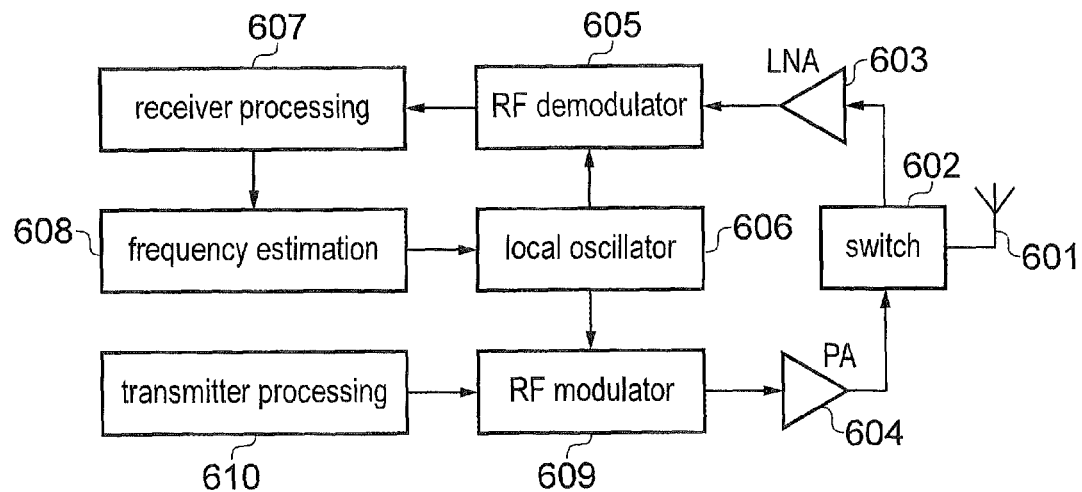
FIG. 6 is a high-level block diagram of an example HD-FDD UE transceiver.

FIG. 6 shows a high level block diagram of the UE architecture of an HD-FDD modem. This modem contains a switch 602 close to an antenna 601. The switch 602 either allows signals from a power amplifier (PA) 604 to the transmitted by the antenna 601 or signals received from the antenna 601 to reach a low noise amplifier (LNA) 603. In this architecture, it is not possible for the downlink signals to be received by the LNA 603 whilst signals are being transmitted by the PA 604. The amplified signal from the LNA 603 is demodulated by an RF demodulator 605. One of the components of the RF demodulator 605 is a mixer, which downconverts the received signal, based on a signal produced by a local oscillator 606. The local oscillator is one example of a reference frequency source. A receiver processing function 607 performs various functions, such as fast Fourier transforms (FFT), physical channel processing, transport channel processing and channel estimation. Signals from the receiver processing function 607 are provided to a frequency estimation block 608, which estimates a frequency error between the UE's local oscillator 606 and the eNodeB's oscillator (using, for example, the primary and secondary synchronisation signals, NB-PSS, NB-SSS and reference signals such as narrowband reference signals (NB-RS), cell-specific reference signals (CRS)) and controls the frequency of the signal produced by the local oscillator 606. As such, there is a feedback loop based on the downlink signal that controls the frequency of the local oscillator 606. The signal produced by the local oscillator 606 is also used by an RF modulator 609 to upconvert the signal produced by a transmitter processing block 610 for transmission to the eNodeB. By virtue of the UE being able to monitor the downlink signal in the frequency estimation function 608, the UE is able to control the frequency of the uplink transmission to be within the tolerance required by the eNodeB. The ability of the UE to monitor the downlink signal is impaired when there are long uplink transmissions.

Figure 7:
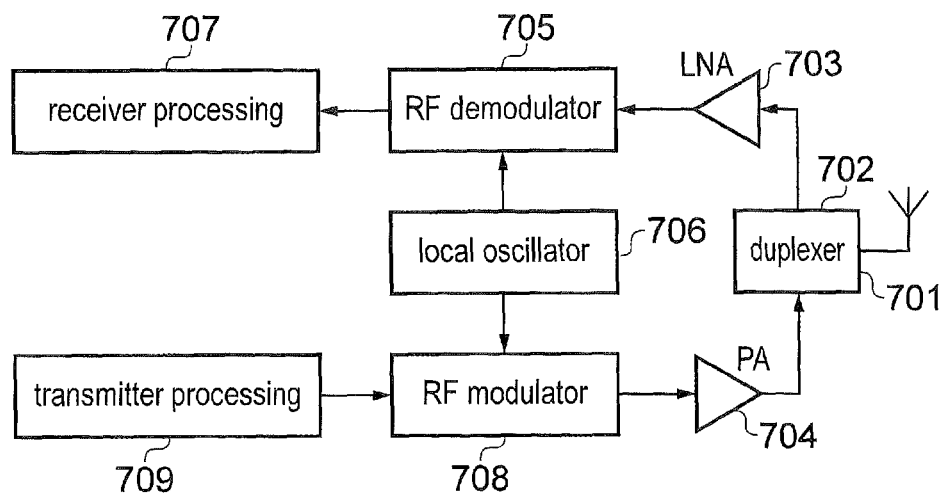
FIG. 7 is a high-level block diagram of an example HD-FDD eNodeB transceiver.

The eNodeB architecture is implementation specific, and FIG. 7 shows a high level block diagram of an example eNodeB architecture of an HD-FDD modem. The eNodeB operates in full duplex mode, being able to transmit to some HD-FDD UEs in the downlink while simultaneously receiving from other HD-FDD UEs in the uplink. Hence, the eNodeB contains a duplexer 702 close to the antenna 701. The duplexer 702 allows signals from a power amplifier (PA) 704 to be transmitted by the antenna 701 on a DL carrier frequency and for signals to be received from the antenna 701 to simultaneously reach a low noise amplifier (LNA) 703. The amplified signal from the LNA 703 is demodulated by an RF demodulator 705. One of the components of the RF demodulator 705 is a mixer, which downconverts the received signal, based on a signal produced by a local oscillator 706. A receiver processing function 707 performs various functions, such as fast Fourier transforms (FFT), physical channel processing, transport channel processing and channel estimation. The signal produced by the local oscillator 706 is also used by an RF modulator 708 to upconvert the signal produced by a transmitter processing block 709 for transmission to the UE.

As can be seen in FIG. 7, a main difference between the eNodeB and UE architectures is that the eNodeB architecture does not include a frequency estimation block. The eNodeB assumes that the UE has performed frequency estimation and correction (based on the UE's measurement of the eNodeB's downlink transmit signal) and thus that the frequency tolerance of the UE's transmission is within a specified tolerance of the eNodeB's local oscillator frequency (e.g. ±0.1 ppm).

Other eNodeB architectures may include a frequency estimation block that operates on a per UE basis (i.e. one frequency estimation block operates to estimate the frequency error of one UE, and there are plural estimation blocks for plural UEs). Such an arrangement can lead to improved demodulation performance at the eNodeB.

Two methods and architectural implementations are proposed in the present disclosure in order to solve the problem of frequency drift of an NB-IoT UE. The first of these embodiments ensures that the frequency error of the NB-IoT device is kept as low as possible, and as such within the required frequency error range, while the UE is transmitting for long time durations. The second of these embodiments ensures that large frequency errors (i.e. those which are outside of the required frequency error range) accumulated by the UE during uplink transmissions of long time durations may be tolerated by the eNodeB.

Frequency Offset Indication

Figure 8:
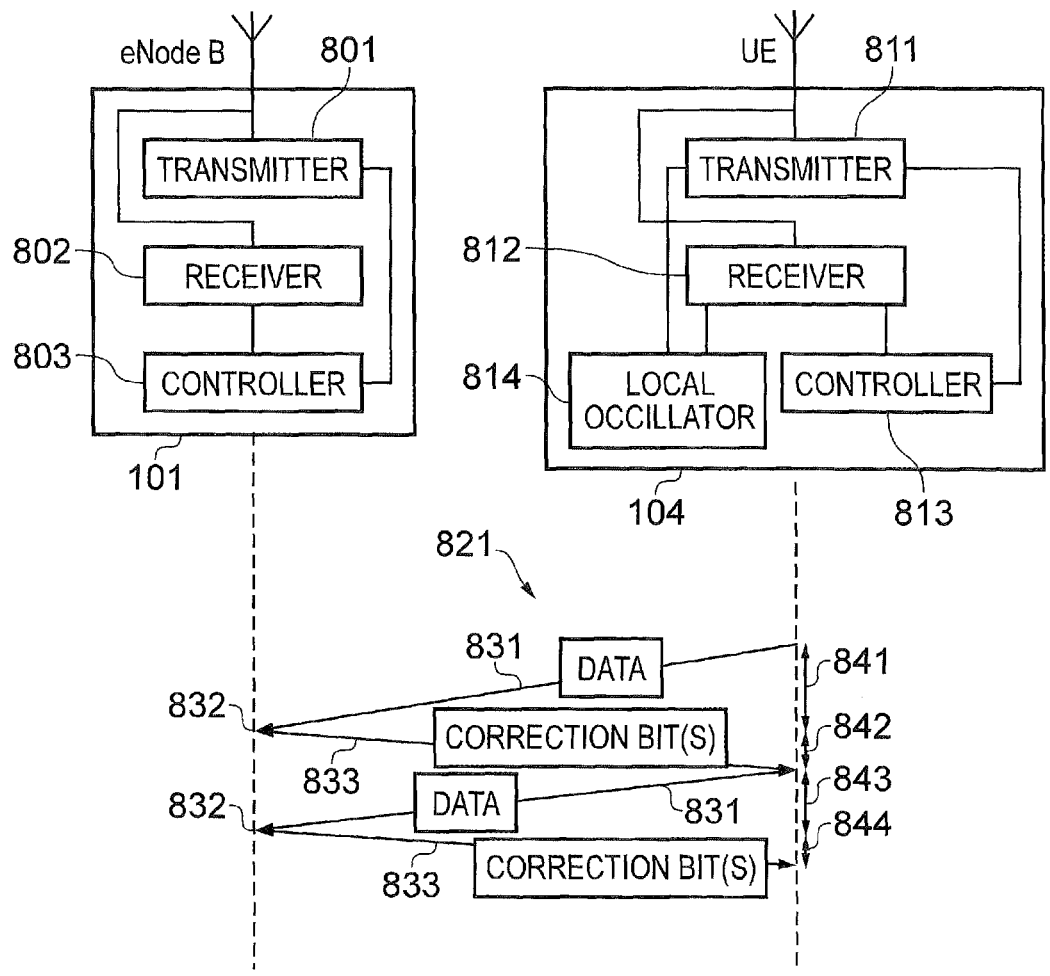
FIG. 8 is a part schematic block diagram of a communications device and an infrastructure equipment, and part message flow diagram illustrating a process of receiving a message which may have been transmitted with a frequency error from the communications device at the infrastructure equipment in accordance with a first embodiment of the present technique.

A first embodiment of the present technique can provide an arrangement in which a mobile communications device or UE 104 can operate to communicate in a wireless communications system via a base station or infrastructure equipment FIG. 8 is a part schematic block diagram of a communications device 104 and an infrastructure equipment 101, and part message flow diagram illustrating a process of receiving a message which may have been transmitted with a frequency error from the communications device 104 at the infrastructure equipment 101 in accordance with an embodiment of the present technique. Each of the infrastructure equipment 101 and communications device 104 comprise a transmitter 801, 811, a receiver 802, 812 and a controller 803, 813 to control the transmitter 801, 811 and receiver 802, 812. The communications device 104 further comprises a local oscillator 814 configured to control an output frequency of the signals transmitted by the transmitter 811 of the communications device 104.

The receiver 802 of the infrastructure equipment 101 is configured to receive signals 831 comprising data from the communications device 104 in accordance with a wireless access interface 821 of the wireless communications system. The controller is configured in combination with the receiver and the transmitter to measure 832 a frequency error of the signals 831 received from the communications device, the frequency error being an amount by which a carrier frequency of the received signals 831 differs from a predetermined frequency, and to transmit, in one or more temporal periods 842, 844, during which reception of the signals transmitted by and received from the one of the communications devices is paused, a frequency correction signal 833 to the one of the communications devices, the frequency correction signal providing an indication of a correction to compensate for the measured frequency error. During a long transmission 841, 843, such as of the signal 831, the communications device 104 is configured to insert temporal gaps 842, 844 into the transmission 841, 843, in order to allow for the infrastructure equipment 101, on measuring 832 a potential frequency error 832 of the communications device 104 to transmit the frequency correction signal 833 in the form of a bit or plurality of bits. The temporal gaps 842, 844 may include transmissions from the infrastructure equipment and time to allow for scheduling of the transmissions 833. The frequency correction signal 833 may be an exact value or a quantised value, and may be equal to the (potentially quantised) measured frequency, instructing the communications device 104 that its output frequency is offset from the expected output frequency by the value of the frequency correction signal 833. The frequency correction signal 833 may alternatively be a frequency correction command equal and opposite to the (potentially quantised) measured frequency, instructing the communications device 104 to correct its output frequency by the value of the frequency correction signal 833.

In arrangements of this first embodiment of the present technique, the frequency error can be measured by the eNodeB by one or more of the following techniques:

By monitoring reference signals transmitted by the UE. In current LTE releases, the UE transmits one DMRS (demodulation reference signal) per slot. Alternatively, the UE transmits new reference signals, dedicated for the purposes of frequency estimation.

The UE transmits synchronisation signals within the uplink data stream that are inserted for the purposes of allowing the eNodeB to perform frequency estimation on the UE's signal. For example, some subframes of the uplink transmission may carry synchronisation signals.

Remodulating uplink signals received by the UE. For example, if the UE transmits UCI (uplink control information) piggybacked onto the PUSCH (UL data channel), and the duration of these UCI is less than the duration of the PUSCH, the eNodeB can decode these UCI, remodulate them and use the remodulated signal as a reference from which the frequency error of the UE can be estimated.

Figure 9:
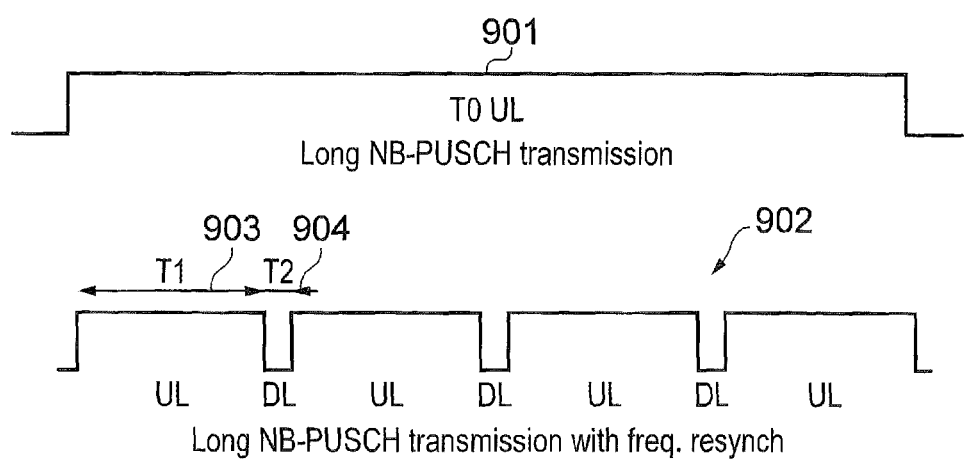
FIG. 9 illustrates an example manner of the insertion of transmission gaps into uplink transmissions to allow for frequency correction.
Figure 10:
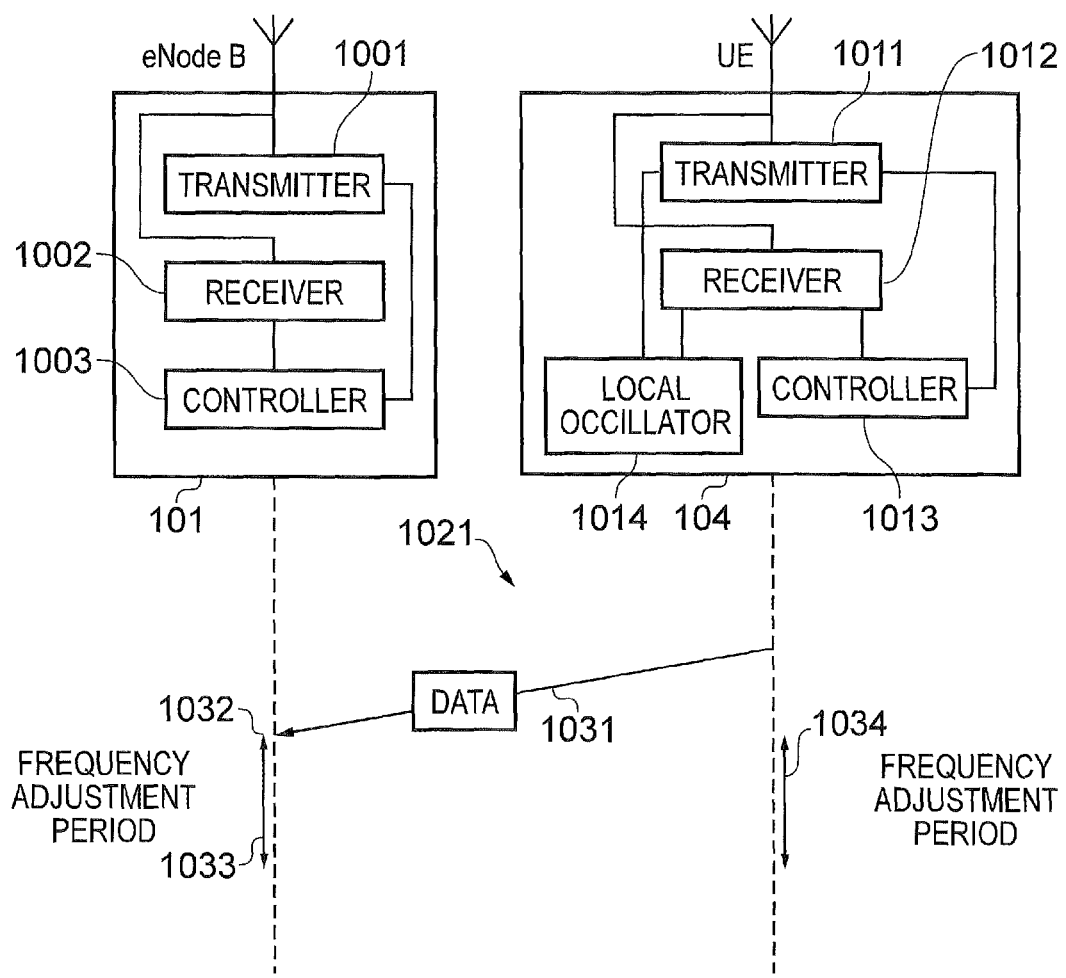
FIG. 10 is a part schematic block diagram of a communications device and an infrastructure equipment, and part message flow diagram illustrating a process of receiving a message which may have been transmitted with a frequency error from the communications device at the infrastructure equipment in accordance with a second embodiment of the present technique.

The temporal periods, or transmission gaps, are inserted within the uplink transmission, as shown in FIG. 9. As can be seen in FIG. 9, a long uplink transmission 901 of duration T0 is split up 902 into shorter uplink transmissions 903 of duration T1 with gaps 904 of duration T2. During the gaps of duration T2, the eNodeB may transmit frequency correction signals to the UE. Typically, the transmission period T1 may be of the order of 100 ms, while the transmission gap period may be of the order of 10 ms. The transmission period T1 should be chosen to be less than the time at which the UE's frequency could drift to such an extent that it cannot decode the eNodeB's downlink transmissions (due to excess frequency error).

The frequency error correction signals can be sent in various different manners:
- By downlink control information (DCI) signaling (transmitted on PDCCH, NB-PDCCH or M-PDCCH). The signal can either be sent unicast to a single UE, or can be multiplexed with frequency error correction signals for other UEs. The frequency error correction signal can take the form of:
  - A single bit ("up" or "down", where the frequency step size is known to the UE, e.g. via specification or RRC signaling). If the UE does not receive a frequency error correction signal, it does not alter its local oscillator frequency.
  - Multiple bits for a relative change in frequency (e.g. 3 bit signaling could indicate '000'=>−200 Hz, '001'=>−100 Hz, '010'=>no change, '011'=>+100 Hz, '100'=>+200 Hz).
  - Multiple bits for an absolute change in frequency.
- As a physical layer field in some other downlink transmission to the UE. For example, the frequency error correction signal can be sent in some of the resource elements that are close to downlink reference signals.
- As a new physical channel that is transmitted in the downlink. For example, in NB-IoT, the first few OFDM symbols of the subframe may not be used in guardband and standalone operation modes (for compatibility with an in-band mode, where the NB-IoT carrier shares spectrum with an LTE carrier). In this case, a frequency error correction channel can be transmitted in these otherwise unused OFDM symbols (i.e. in otherwise unused communication resources). In another example, a new physical channel can be transmitted on an NB-IoT anchor carrier (regardless of whether the UE is being serviced on an anchor carrier or a secondary carrier). An anchor carrier is an NB-IoT carrier that conveys one or more of synchronisation signals and system information signals. A UE initially attaches to an anchor carrier and may subsequently be re-assigned to a secondary carrier.

The timing of the T2 periods can be:
- Indicated to the UE in the original uplink grant (that assigned the long uplink transmission) or UE-specifically via RRC signaling. The periodicity of the T2 periods can be a function of UE capability (e.g. UEs that report use of inaccurate crystal oscillators are assigned frequent T2 periods, whereas UEs with accurate crystal oscillators are assigned infrequent T2 periods). UEs may signal their capability or frequency stability to the eNodeB.
- Synchronous with the subframe structure (e.g. it is known by all UEs that when SFN mod M=0, frequency error correction signals are sent to UEs. M is known to UEs either by specification or RRC signaling). This mode of operation is advantageous when frequency error correction signals are multiplexed to multiple UEs on a single channel (e.g. in a single DCI).

The UE corrects its local oscillator in response to the frequency error correction signals and continues its uplink transmission.

Advantages of the first embodiment of the present technique include that it allows for a half-duplex UE to operate with a lower cost frequency oscillator, and that the burden of frequency correction is moved to the eNodeB, which has greater processing power and is less cost sensitive than the UE. The eNodeB is also best placed to measure frequency error when the UE is transmitting.

Frequency Offset Tolerance

Figure 11:
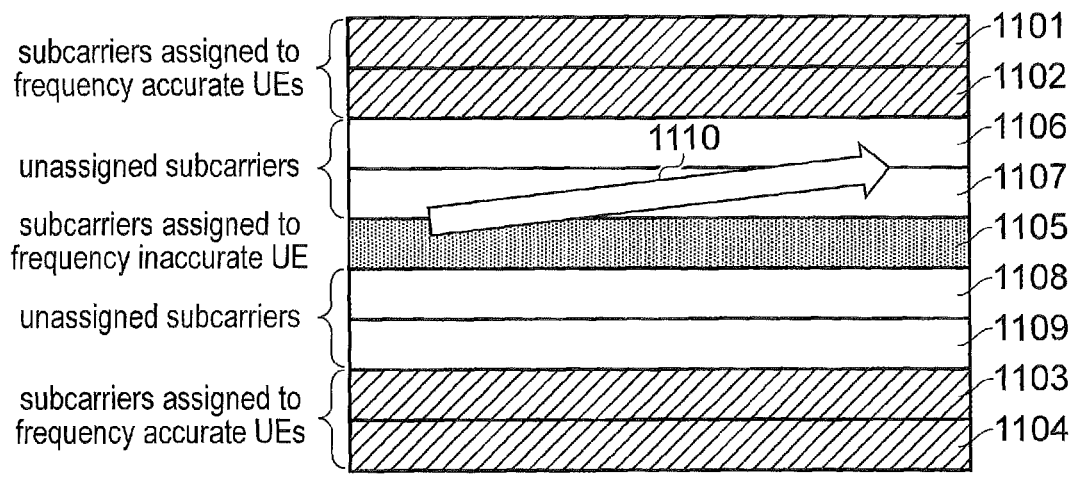
FIG. 11 illustrates an example of an assignment of subcarriers to allow for transmissions from a UE with a low accuracy frequency oscillator.

A second embodiment of the present technique can provide an arrangement in which a mobile communications device or UE 104 can operate to communicate in a wireless communications system via a base station or infrastructure equipment FIG. 11 is a part schematic block diagram of a communications device 104 and an infrastructure equipment 101, and part message flow diagram illustrating a process of receiving a message which may have been transmitted with a frequency error from the communications device 104 at the infrastructure equipment 101 in accordance with a second embodiment of the present technique. Each of the infrastructure equipment 101 and communications device 104 comprise a transmitter 1001, 1011, a receiver 1002, 1012 and a controller 1003, 1013 to control the transmitter 1001, 1011 and receiver 1002, 1012. The communications device 104 further comprises a local oscillator 1014 configured to control an output frequency of the signals transmitted by the transmitter 1011 of the communications device 104.

The receiver 1002 of the infrastructure equipment 101 is configured to receive signals 1031 comprising data from the communications device 104 in accordance with a wireless access interface 1021 of the wireless communications system. The controller is configured in combination with the receiver and the transmitter to determine 1032 whether a duration of the reception of the signals 1031 from the communications device 104 exceeds a predetermined threshold, and if so subsequently to delay transmission of signals to the one of the communications devices for a predetermined frequency adjustment period 1033 following the reception of the signals 1031 from the communications device 104. The communications device 104 is configured to, following the transmission of the signals 1031 to the infrastructure equipment 101, receive no signals from the infrastructure equipment 101 for a predetermined frequency adjustment period 1034. In arrangements of the second embodiment of the present technique, the communications device 104, if it is determined that signals have not been received from the infrastructure equipment 101 for longer than the predetermined frequency adjustment period 1034 following the transmission of the signals 1031 to the infrastructure equipment 101, subsequently to synchronise the output frequency in accordance with a received synchronisation signal, which may be received from the infrastructure equipment or from another communications device within range of the communications device 104.

In arrangements of this second embodiment of the present technique, the infrastructure equipment 101 is configured to communicate to the communications device 104 that, for any PUSCH repetition that exceeds a threshold, the communications device 104 would have a prolonged frequency adjustment period 1034 after the PUSCH transmission. This threshold can be defined in the specifications or RRC signaled to the communications device 104. Alternatively, the infrastructure equipment 101 is configured to indicate in DCI signaling (for example, uplink grant) that the communications device 104 can expect the prolonged frequency adjustment period 1034 after the PUSCH transmission. During the frequency adjustment period 1034, the communications device 104 can resynchronise to the network.

In arrangements of this second embodiment of the present technique, the eNodeB can operate in a mode that is tolerant of large frequency offsets by:
  Not assigning subcarriers that are adjacent to a subcarrier assigned to a UE that (1) is assigned long uplink transmissions and/or (2) has a low accuracy crystal oscillator. These unassigned carriers allow a UE to drift in frequency into these unassigned carriers.
  Implementing a frequency error tolerant decoding algorithm. For example:
    Blind decoding with multiple hypotheses of frequency carrier offset from the UE
    Tracking the frequency error of the UE transmission (e.g. through the DMRS signals in the uplink transmission) and compensating for these frequency errors.

FIG. 11 shows an assignment of subcarxiers to allow for transmissions from a UE with a low accuracy frequency oscillator. Accurate UEs may be assigned subcarriers 1101 to 1104. A subcarrier 1105 may be assigned to a frequency-inaccurate UE, such that the assigned subcarrier 1105 is surrounded by unassigned subcarriers 1106 to 1109 that allow the transmission from the frequency inaccurate UE to drift away from its assigned frequency (as shown by the arrow 1110) without drifting into a frequency assigned to the accurate UEs.

Alternatively, the eNodeB can treat the signals received from UEs with a large frequency error as interference into transmissions from other UEs and use advanced receiver algorithms (such as successive interference cancellation) to tolerate the inter-carrier interference created from these UEs.

Figure 12:
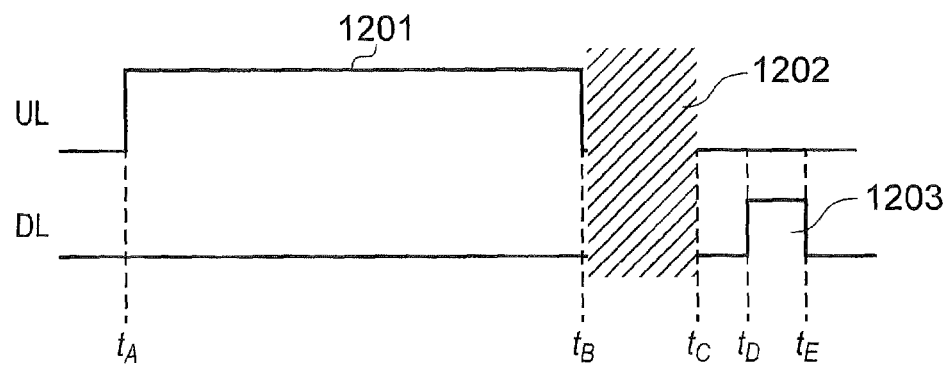
FIG. 12 illustrates a timing diagram of UE and eNodeB transmissions according to the second embodiment of the present technique.

FIG. 12 shows a timing diagram of UE and eNodeB transmissions according to the second embodiment of the present technique. The UE transmits in the uplink for a long time 1201 between $t_A$ and $t_B$. During this time, the frequency error of the UE transmission may become large. The eNodeB implements a receiver processing algorithm that is tolerant to a frequency error. At time $t_B$, the UE's uplink transmission terminates. The UE may then re-synchronise to the downlink (e.g. using the NB-PSS and NB-SSS synchronisation signals, the NB-PBCH and/or the NB-RS reference signals).

During the time period 1202 $t_B$ to $t_C$, the eNodeB does not transmit NB-PDCGH or NB-PDSCH (or equivalent for another technology) to the UE. The eNodeB still transmits other signals in the downlink (to other UEs and broadcast signals, such as NB-PSS, NB-SSS, NB-PBCH, NB-RS). The eNodeB may transmit a UE-specific synchronisation signal to help the UE (that transmitted the long uplink transmission) to regain frequency synchronisation. Example UE-specific signals may be based on the NB-PSS or NB-SSS, but using a different scrambling sequence (to avoid the creation of false alarms with the main NB-PSS/NB-SSS). Alternatively any sequence that is known between the UE and eNodeB can be transmitted by the eNodeB. In some arrangements of the second embodiment, these synchronisation signals may be power boosted or beamformed. In some arrangements of the second embodiment, the synchronisation signals may be transmitted as device-to-device (D2D) communications to the UE from other UEs in the network, following a command transmitted to the other UEs by the eNodeB.

After time $t_C$, the UE is able to receive downlink transmissions from the eNodeB. At time $t_D$, the eNodeB initiates a downlink transmission 1203 to the UE, which may be for example, an acknowledgement (ACK/NACK) relating to the previous uplink transmission. At time $t_E$, the eNodeB finishes the downlink transmission to the UE.

During the resynchronisation time period 1202 between $t_B$ and $t_C$ the eNodeB does not transmit downlink signals to the UE. As explained previously, during this time period 1202, the UE can resynchronise to the eNodeB by, for example, using the NB-PSS, NB-SSS or NB-PBCH in the anchor carrier. This resynchronisation time period 1202 is known to the eNodeB and the UE. For example, it may be:
  Predefined in the specifications; for example, that for any uplink transmission, e.g. PUSCH repetitions, that exceeds a threshold, this resynchronisation time period would be automatically provided. The length of this resynchronisation time period is also specified in the specifications.
  Configured by the eNB. For example, the eNodeB can signal to the UE e.g. using RRC signaling, that for any uplink transmission whose length, e.g. due to PUSCH repetition, exceeds a threshold, a resynchronisation time period such as that 1202 between $t_B$ and $t_C$, is provided. The length of this resynchronisation time period can also be configured. The threshold and the length of the resynchronisation time period can be based on a UE capability or based on past measurements from the eNodeB.
  Dynamically indicated by the eNodeB, for example in the uplink grant. The eNodeB for example can indicate this resynchronisation time period to the UE if a scheduled PUSCH transmission has repetitions that exceed a predetermined value. The eNodeB can also determine whether there is any discontinuous transmission for the scheduled uplink transmission, where during the discontinuous transmission, the UE can resynchronise to the network, provided that the period of such discontinuous transmission may not require the resynchronisation time period.

In arrangements of this second embodiment of the present technique, the eNodeB is configured to tolerate the frequency error from the UE, and to transmit a command in the time period 1202 to the one UE at a frequency shifted from a preconfigured frequency of transmission of the infrastructure equipment by an amount equal to a frequency error of the UE. This command indicates to the UE that the frequency of its transmissions should be corrected by an amount equal and opposite to the frequency error.

In arrangements of this second embodiment of the present technique, uplink transmissions during the time period 1201 between $t_A$ and $t_B$ may be discontinuous, with transmission gaps inserted for frequency drift correction at the UE. However, the final transmission period after the final transmission gap may still be long enough for the UE frequency to drift, and so a time period 1202 is required for the UE to correct its frequency before signals may be received on the downlink from the eNodeB.

Advantages of the second embodiment of the present technique include that it allows for a half-duplex UE to operate with a lower cost frequency oscillator, and that the burden of frequency correction is moved to the eNodeB, which has greater processing power and is less cost sensitive than the UE. Further, transmission gaps do not need to be inserted into the uplink transmission. This allows the UE to terminate transmission of its uplink/downlink message sequence earlier, which in turn allows the UE to turn its modem off earlier, thus saving power.

Frequency Offset Tolerance Using Transmission Gaps

A third embodiment of the present technique can provide an arrangement in which a mobile communications device or UE 104 can operate to communicate in a wireless communications system via a base station or infrastructure equipment 101. Each of the infrastructure equipment 101 and communications device 104 comprise a transmitter, a receiver and a controller to control the transmitter and receiver. The communications device 104 further comprises a local oscillator configured to control an output frequency of the signals transmitted by the transmitter of the communications device 104.

The receiver of the infrastructure equipment 101 is configured to receive uplink signals comprising data from the communications device 104 in accordance with a wireless access interface of the wireless communications system in a plurality of transmission periods, each of the plurality of transmission periods being separated from a next transmission by a predetermined period in which the communications device 104 receives downlink signals from the infrastructure equipment to correct a transmission frequency with respect to a carrier frequency of allocated communications resources. After a last of the transmission periods in which the uplink signals are received from the communications device 104, the controller of the infrastructure equipment 101 is configured in combination with the receiver and the transmitter of the infrastructure equipment 101 to determine whether the duration of reception of the signals from the communications device 104 in the last of the transmission periods exceeded a predetermined threshold, and if so to control the transmitter to delay transmission of signals to the communications device 104 for a second predetermined period following the reception of the signals from the communications device 104. The first and second predetermined periods may be the same, or alternatively may have different temporal lengths.

Figure 13:
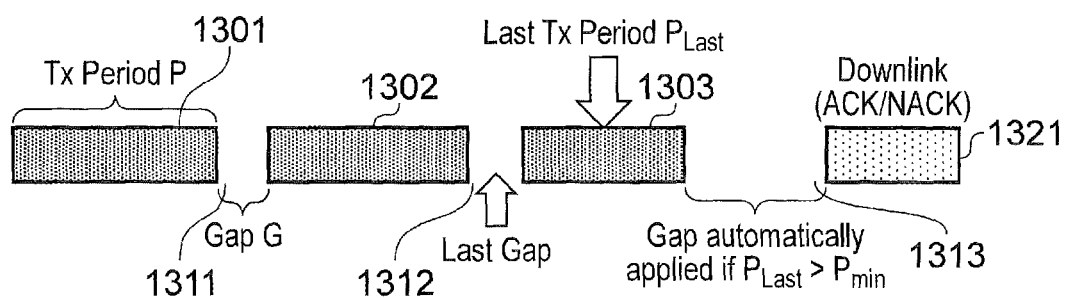
FIG. 13 illustrates an example of a timing diagram of UE and eNodeB transmissions according to a third embodiment of the present disclosure.

FIG. 13 illustrates an example of a timing diagram of UE and eNodeB transmissions according to the third embodiment of the present disclosure. This third embodiment differs from the second embodiment in that the communications device inserts transmission gaps into its uplink transmissions to the infrastructure equipment. However, it is still potentially the case that, even with the transmission gaps, each transmission period or segment may be of a sufficient temporal length for frequency drift to occur at the local oscillator of the communications device so as to impair the performance of the UE when the UE subsequently decodes the eNodeB's transmissions.

Transmission of a signal comprising data is split into three transmission periods 1301, 1302 and 1303. Between transmission period 1301 and transmission period 1302 is a first transmission gap 1311, and between transmission period 1302 and transmission period 1303 is a second transmission gap 1312. Following the final transmission period 1303, if it is determined that the final transmission period 1303 exceeded a predetermined threshold, a further transmission gap 1313 is applied, in order for the communications device to correct a frequency offset which is judged to have occurred due to frequency drift during long transmissions. Following this transmission gap 1313, the eNodeB initiates a downlink transmission 1321 to the UE, which may be for example, an ACK/NACK relating to the previous uplink transmission.

In arrangements of the present embodiment, if the time taken between the transmission period 1301 and the transmission period 1302 is X, and the time taken for the transmission gap 1311 and the transmission gap 1312 is Y, the next downlink transmission is at a time that is greater than or equal to the start time of transmission period 1303+X+Y+the frequency offset. In other words, the last transmission 1303 is treated as though it were a full "period X" and insert a "gap Y" of the normal duration. The offset (which typically, the normal defined timing relationship from NB-PUSCH to A/N is that the time is >=3 ms). In this case, it is not necessary to compare the last transmission period 1303 duration to a predetermined threshold.

The transmission periods previously discussed in the present disclosure take account of invalid uplink subframes. For example, if every subframe 0 of a radio frame is invalid, then transmission period 1301 is the time including the time taken up by these invalid subframes.

Figure 14:
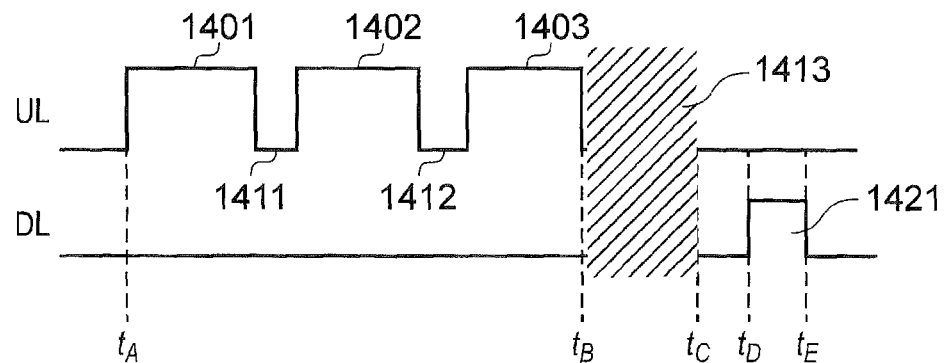
FIG. 14 illustrates another example of a timing diagram of UE and eNodeB transmissions according to the third embodiment of the present technique.

FIG. 14 shows a second example of a timing diagram of UE and eNodeB transmissions according to the third embodiment of the present technique. The UE transmits in the uplink for a long time between $t_A$ and $t_B$. This transmission is split into segments 1401, 1402 and 1403 interspersed with transmission gaps 1411 and 1412. During the transmission gaps, the UE 1411, 1412, the UE is able to correct the frequency error of its transmissions, e.g. via the method of frequency offset indication previously discussed, or by some other method of frequency error correction. At time $t_B$, the UE's uplink transmission terminates. The UE may then re-synchronise to the downlink (e.g. using the NB-PSS and NB-SSS synchronisation signals, the NB-PBCH and/or the NB-RS reference signals).

During the time period 1413 $t_B$ to $t_C$, the eNodeB does not transmit NB-PDCCH or NB-PDSCH (or equivalent for another technology) to the UE. The eNodeB still transmits other signals in the downlink (to other UEs and broadcast signals, such as NB-PSS, NB-SSS, NB-PBCH, NB-RS). The eNodeB may transmit a UE-specific synchronisation signal to help the UE (that transmitted the long uplink transmission) to regain frequency synchronisation. Example UE-specific signals may be based on the NB-PSS or NB-SSS, but using a different scrambling sequence (to avoid the creation of false alarms with the main NB-PSS/NB-SSS). Alternatively any sequence that is known between the UE and eNodeB can be transmitted by the eNodeB. In some arrangements of the third embodiment, these synchronisation signals may be power boosted or beamformed. In some arrangements of the third embodiment, the synchronisation signals may be transmitted as device-to-device (D2D) communications to the UE from other UEs in the network, following a command transmitted to the other UEs by the eNodeB.

After time $t_C$, the UE is able to receive downlink transmissions from the eNodeB. At time $t_D$, the eNodeB initiates a downlink transmission 1421 to the UE, which may be for example, an ACK/NACK relating to the previous uplink transmission. At time $t_E$, the eNodeB finishes the downlink transmission to the UE.

During the resynchronisation time period 1413 between $t_B$ and $t_C$ the eNodeB does riot transmit downlink signals to the UE. As explained previously, during this time period 1413, the UE can resynchronise to the eNodeB by, for example, using the NB-PSS, NB-SSS or NB-PBCH in the anchor carrier, This resynchronisation time period 1413 is known to the eNodeB and the UE. For example, it may be, as in the second embodiment:

Predefined in the specifications; for example, that for any uplink transmission, e.g. PUSCH repetitions, that exceeds a threshold, this resynchronisation time period would be automatically provided. The length of this resynchronisation time period is also specified in the specifications.

Configured by the eNB. For example, the eNodeB can signal to the UE e.g. using RRC signaling, that for any uplink transmission whose length, e.g. due to PUSCH repetition, exceeds a threshold, a resynchronisation time period such as that 1413 between $t_B$ and $t_C$, is provided. The length of this resynchronisation time period can also be configured. The threshold and the length of the resynchronisation time period can be based on a UE capability or based on past measurements from the eNodeB.

Dynamically indicated by the eNodeB, for example in the uplink grant The eNodeB for example can indicate this resynchronisation time period to the UE if a scheduled PUSCH transmission has repetitions that exceed a predetermined value. The eNodeB can also determine whether there is any discontinuous transmission for the scheduled uplink transmission, where during the discontinuous transmission, the UE can resynchronise to the network, provided that the period of such discontinuous transmission may not require the resynchronisation time period.

In arrangements of this third embodiment of the present technique, the eNodeB is configured to tolerate the frequency error from the UE, and to transmit a command in the time period 1413 to the one UE at a frequency shifted from a preconfigured frequency of transmission of the infrastructure equipment by an amount equal to a frequency error of the UE. This command indicates to the UE that the frequency of its transmissions should be corrected by an amount equal and opposite to the frequency error.

Advantages of the third embodiment of the present technique include that it allows for a half-duplex UE to operate with a lower cost frequency oscillator, and that the burden of frequency correction is moved to the eNodeB, which has greater processing power and is less cost sensitive than the UE. This is the case even when the transmissions from the UE are not continuous, and there are transmission gaps between transmission periods of the uplink transmissions.

Transmission Control at the Communications Device

There are cases where the eNodeB cannot tolerate a frequency drift from the UE and supports neither of the following:

The UE inserting uplink transmission gaps and the UE performing frequency offset correction through measurements on downlink signals; nor Inserting uplink transmission gaps and receiving frequency error correction commands from the eNodeB In this case the eNodeB can configure the UE not to insert uplink transmission gaps (either by UE-specific signaling or via system information). However, the UE implements a low cost crystal oscillator and its frequency can drift beyond the specification of 0.1 ppm if uplink transmissions are greater than a certain amount, T_UL_MAX. For example, this maximum uplink transmission period, T_UL_MAX may be 256 ms.

When the UE is configured to insert not UL transmission gaps, the following arrangements are applicable:

When the UE receives a downlink control indicator (DCI, i.e. uplink grant) indicating an uplink transmission that extends beyond the maximum uplink transmission period T_UL_MAX, the UE considers the DCI to contain "inconsistent control information" and hence ignores the uplink grant. In this case, the UE does not transmit the narrowband NB-PUSCH.

When the UE receives a DCI (uplink grant), it determines the length of the uplink transmission as the minimum value of either the maximum uplink transmission period T_UL_MAX or the uplink transmission time as indicated in the uplink grant.

In arrangements of the fourth embodiment, the eNodeB configures the UE not to insert uplink transmission gaps through system information signaling:

When the UE sends NB-PRACH, the uplink transmission time for NB-PRACH is the minimum value of either the maximum uplink transmission period T_UL_MAX or the uplink transmission time for the coverage level of UE If the UE determines that it cannot transmit an NB-PRACH (due to the uplink transmission time being exceeded), the UE does not transmit NB-PRACH in this cell and searches for another cell In other words, the communications device is configured to receive from the infrastructure equipment an indication of communications resources in which the transmitter can transmit signals to the infrastructure equipment, to determine whether a period required to transmit an uplink transmission to the infrastructure equipment in the indicated communications resources exceeds a predetermined threshold, and if so, subsequently to control the transmitter not to transmit signals to the infrastructure equipment using the indicated communications resources. If the period required to transmit the uplink transmission to the infrastructure equipment exceeds the predetermined threshold, the communications device is configured to search for a second infrastructure equipment to which the uplink transmission can be transmitted. The communications device may determine the period required to transmit the uplink transmission to the infrastructure equipment based on a coverage level of the communications device.

In arrangements of the fourth embodiment, when the eNodeB does not support uplink transmission gaps, it indicates (e.g. implicitly) that coverage levels which would lead to large uplink transmission gaps (of NB-PRACH or NB-PUSCH) of greater than T_UL_MAX are not supported. In this case, UEs have the following behaviours:

HD-FDD UEs with low cost crystal oscillators do not NB-PRACH onto this cell

HD-FDD UEs with high accuracy crystal oscillators (e.g. temperature compensated crystal oscillator (TCXO)) will NB-PRACH onto this cell FD-FDD UEs (e.g. enhanced MTC (eMTC) UEs attaching to an eMTC cell) will PRACH onto the cell. Note that these UEs can compensate for frequency tracking error by tracking the downlink simultaneously with transmitting in the uplink In other words, the reference frequency source of the communications device has a predetermined accuracy relating to an amount of frequency drift of the output frequency with respect to time. If the period required to transmit the uplink transmission to the infrastructure equipment exceeds the predetermined threshold, the communications device is configured to determine whether the amount of frequency drift caused by the reference frequency source with the predetermined accuracy is within a predetermined limit, so that if the frequency drift is within the predetermined limit (depending upon an accuracy of the reference frequency source (having a predetermined accuracy)) a controller of the communications device is configured to control the transmitter and the receiver to transmit signals to and to receive signals from the infrastructure equipment, using the indicated communications resources. This is because the communications resources can nevertheless be used, notwithstanding a temporal length of the transmission, because the accuracy of the reference frequency source (crystal oscillator) is high enough that the frequency drift is still within a tolerable limit.

In a sub-embodiment of these arrangements of the fourth embodiment, there are two lists of coverage levels indicated by the eNodeB (e.g. in system information):

A set of coverage levels for HD-FDD UEs that have low cost crystal oscillators (and may need to insert UL transmission gaps)

A set of coverage levels for other UEs

In this case, the UE reads the appropriate list of coverage levels and PRACHs to the cell (or not) accordingly.

The following numbered paragraphs provide further example aspects and features of the present technique:

Paragraph 1. An infrastructure equipment forming part of a mobile communications network configured to transmit signals to and receive signals from one or more communications devices, the infrastructure equipment comprising a receiver configured to receive signals on the uplink from the one or more communications devices via a wireless access interface of the mobile communications network, a transmitter configured to transmit signals on the downlink to the one or more communications devices via the wireless access interface, and a controller configured to control the receiver to receive the signals and to control the transmitter to transmit the signals, wherein the controller is configured in combination with the receiver and the transmitter to measure a frequency error of signals received from one of the communications devices, the frequency error being an amount by which a carrier frequency of the received signals differs from a predetermined frequency, and to transmit, in one or more temporal periods, during which reception of the signals transmitted by and received from the one of the communications devices is paused, a frequency correction signal to the one of the communications devices, the frequency correction signal providing an indication of a correction to compensate for the measured frequency error.

Paragraph 2. An infrastructure equipment according to Paragraph 1, wherein the infrastructure equipment is configured to measure the frequency error by monitoring reference signals transmitted by and received from the one of the communications devices.

Paragraph 3. An infrastructure equipment according to Paragraph 1, wherein the infrastructure equipment is configured to measure the frequency error by receiving synchronisation signals from the one of the communications devices and performing frequency estimation on the received synchronisation signals.

Paragraph 4. An infrastructure equipment according to Paragraph 1, wherein the infrastructure equipment is configured to measure the frequency error by remodulating the signals received from the one of the communications devices, and estimating the frequency error in accordance with the remodulated received signals.

Paragraph 5. An infrastructure equipment according to any of Paragraphs 1 to 4, wherein the infrastructure equipment is configured to transmit the frequency correction signal on a downlink control channel.

Paragraph 6. An infrastructure equipment according to Paragraph 5, wherein the infrastructure equipment is configured to send the frequency correction signal as a dedicated signal to only the one of the communications devices.

Paragraph 7. An infrastructure equipment according to Paragraph 5, wherein the infrastructure equipment is configured to send the frequency correction signal by multiplexing the frequency correction signal with one or more other frequency correction signals, and transmit the multiplexed frequency correction signals to the one of the communications devices, or to the one of the communications devices and one or more others of the communications devices.

Paragraph 8. An infrastructure equipment according to any of Paragraphs 5 to 7 wherein the frequency correction signal is a frequency correction command comprising a single bit indicating whether the output frequency of the one of the communications devices is greater or less than the predetermined frequency.

Paragraph 9. An infrastructure equipment according to any of Paragraphs 5 to 7 wherein the frequency correction signal is a plurality of bits indicating a value equal to one of a plurality of predetermined levels of frequency change, the one of the predetermined levels of frequency change being the closest to the measured frequency error.

Paragraph 10. An infrastructure equipment according to any of Paragraphs 5 to 7 wherein the frequency correction signal is a plurality of bits indicating a value equal to the measured frequency error.

Paragraph 11. An infrastructure equipment according to Paragraphs 9 or 10 wherein the frequency correction signal is a frequency correction command indicating to the one of the communications devices that the output frequency of the one of the communications devices should be corrected by an amount equal and opposite to the value indicated by the frequency correction signal.

Paragraph 12. An infrastructure equipment according to any of Paragraphs 1 to 11, wherein the infrastructure equipment is configured to transmit the frequency correction signal in otherwise unused communications resources, the unused communications resources being configured by the infrastructure equipment to be dedicated resources for frequency correction signals.

Paragraph 13. A communications device configured to transmit signals to and receive signals from an infrastructure equipment forming part of a mobile communications network, the communications device comprising
- a receiver configured to receive signals on the downlink from the infrastructure equipment via a wireless access interface of the mobile communications network,
- a transmitter configured to transmit signals on the uplink to the infrastructure equipment via the wireless access interface,
- a controller configured to control the receiver to receive the signals and to control the transmitter to transmit the signals, and
- a reference frequency source configured to control an output frequency of the signals transmitted by the transmitter, wherein the controller is configured in combination with the receiver, the transmitter and the reference frequency source
- to insert temporal periods into the signals configured to be transmitted to the infrastructure equipment,
- to transmit the signals to the infrastructure equipment in accordance with the controlled output frequency, wherein transmission of the signals is paused during the inserted temporal periods, and
- to receive from the infrastructure equipment a frequency correction signal, the frequency correction signal providing an indication of a correction to compensate for a frequency error of the reference frequency source, the frequency error being an amount by which the output frequency has changed from a predetermined frequency, wherein the controller is configured in combination with the reference frequency source
- to control the output frequency to correct the frequency error in accordance with the received frequency correction signal.

Paragraph 14. A communications device according to Paragraph 13, wherein the temporal periods inserted into the signals are configured to have a duration which is shorter than a duration of the transmission of the signals between any two of the inserted temporal periods.

Paragraph 15. A communications device according to Paragraph 13 or 14, wherein an indication of a periodicity and the duration of the temporal periods inserted into the signals is transmitted by and received from the infrastructure equipment.

Paragraph 16. A communications device according to any of Paragraphs 13 to 15, wherein an indication of the periodicity and the duration of the temporal periods inserted into the signals are transmitted by and received from the infrastructure equipment, the periodicity and the duration of the temporal periods being in accordance with a capability of the communications device.

Paragraph 17. A communications device according to Paragraph 13 or 14, wherein the periodicity and the duration of the temporal periods are synchronous with a periodicity and a duration of temporal periods inserted into transmission signals by one or more other communications devices of the mobile communications network.

Paragraph 18. A communications device according to Paragraph 13, wherein the temporal periods inserted into the signals are inserted into the signals only if a duration of transmission of the signals exceeds a predetermined threshold.

Paragraph 19. A method of controlling communications at an infrastructure equipment forming part of a mobile communications network configured to transmit signals to and receive signals from one or more communications devices, the method comprising
- measuring a frequency error of signals received from one of the communications devices, the frequency error being an amount by which a carrier frequency of the received signals differs from a predetermined frequency, and
- transmitting, in one or more temporal periods, during which reception of the signals transmitted by and received from the one of the communications devices is paused, a frequency correction signal to the one of the communications devices, the frequency correction signal providing an indication of a correction to compensate for the measured frequency error.

Paragraph 20. A method of controlling communications at a communications device configured to transmit signals to and receive signals from an infrastructure equipment forming part of a mobile communications network, the method comprising
- controlling at a reference frequency source of the communications device an output frequency of signals transmitted by the communications device,
- inserting temporal periods into signals configured to be transmitted to the infrastructure equipment,
- transmitting the signals to the infrastructure equipment in accordance with the controlled output frequency, wherein transmission of the signals is paused during the inserted temporal periods,
- receiving from the infrastructure equipment a frequency correction signal, the frequency correction signal providing an indication of a correction to compensate for a frequency error of the reference frequency source, the frequency error being an amount by which the output frequency has changed from a predetermined frequency, and
- controlling the output frequency to correct the frequency error in accordance with the received frequency correction signal.

Paragraph 21. Circuitry for an infrastructure equipment forming part of a mobile communications network configured to transmit signals to and receive signals from one or more communications devices, the infrastructure equipment comprising
- a receiver configured to receive signals on the uplink from the one or more communications devices via a wireless access interface of the mobile communications network,
- a transmitter configured to transmit signals on the downlink to the one or more communications devices via the wireless access interface, and
- a controller configured to control the receiver to receive the signals and to control the transmitter to transmit the signals, wherein the controller is configured in combination with the receiver and the transmitter
- to measure a frequency error of signals received from one of the communications devices, the frequency error being an amount by which a carrier frequency of the received signals differs from a predetermined frequency, and
- to transmit, in one or more temporal periods, during which reception of the signals transmitted by and received from the one of the communications devices is paused, a frequency correction signal to the one of the communications devices, the frequency correction signal providing an indication of a correction to compensate for the measured frequency error.

Paragraph 22. Circuitry for a communications device configured to transmit signals to and receive signals from an infrastructure equipment forming part of a mobile communications network, the communications device comprising a receiver configured to receive signals on the downlink from the infrastructure equipment via a wireless access interface of the mobile communications network, a transmitter configured to transmit signals on the uplink to the infrastructure equipment via the wireless access interface, a controller configured to control the receiver to receive the signals and to control the transmitter to transmit the signals, and a reference frequency source configured to control an output frequency of the signals transmitted by the transmitter, wherein the controller is configured in combination with the receiver, the transmitter and the reference frequency source to insert temporal periods into the signals configured to be transmitted to the infrastructure equipment, to transmit the signals to the infrastructure equipment in accordance with the controlled output frequency, wherein transmission of the signals is paused during the inserted temporal periods, and to receive from the infrastructure equipment a frequency correction signal, the frequency correction signal providing an indication of a correction to compensate for a frequency error of the reference frequency source, the frequency error being an amount by which the output frequency has changed from a predetermined frequency, wherein the controller is configured in combination with the reference frequency source to control the output frequency to correct the frequency error in accordance with the received frequency correction signal.

Paragraph 23. An infrastructure equipment forming part of a mobile communications network configured to transmit signals to and receive signals from one or more communications devices, the infrastructure equipment comprising a receiver configured to receive signals on the uplink from the one or more communications devices via a wireless access interface of the mobile communications network, a transmitter configured to transmit signals on the downlink to the one or more communications devices via the wireless access interface, and a controller configured to control the receiver to receive the signals and to control the transmitter to transmit the signals, wherein the controller is configured in combination with the receiver and the transmitter to determine whether a duration of reception of signals from one of the communications devices exceeds a predetermined threshold, and if so subsequently to delay transmission of signals to the one of the communications devices for a predetermined period following the reception of the signals from the one of the communications devices.

Paragraph 24. An infrastructure equipment according to Paragraph 23, wherein the length of the predetermined period is assigned in system information block (SIB) signaling.

Paragraph 25. An infrastructure equipment according to Paragraph 23, wherein the length of the predetermined period is assigned dependant on a capability of the one of the communications devices.

Paragraph 26. An infrastructure equipment according to any of Paragraphs 23 to 25, wherein the infrastructure equipment is configured, during the predetermined period, to transmit a synchronisation signal to the one of the communications devices.

Paragraph 27. An infrastructure equipment according to any of Paragraphs 23 to 26, wherein the synchronisation signals are configured to be power boosted or beamformed by the infrastructure equipment.

Paragraph 28. An infrastructure equipment according to any of Paragraphs 23 to 27, wherein the infrastructure equipment is configured to transmit command messages to one or more others of the communications devices, the command messages controlling the one or more others of the communications devices to transmit the synchronisation signals to the one of the communications devices.

Paragraph 29. An infrastructure equipment according to any of Paragraphs 23 to 28, wherein the infrastructure equipment is configured to not allocate communications resources adjacent to communications resources allocated to the one of the communications device to one or more others of the communications devices.

Paragraph 30. An infrastructure equipment according to any of Paragraphs 23 to 29, wherein the infrastructure equipment is configured to decode the received signals from the one of the communications devices in accordance with each of a plurality of frequency offsets.

Paragraph 31. An infrastructure equipment according to any of Paragraphs 23 to 30, wherein the infrastructure equipment is configured to track a frequency error in the received signals from the one of the communications devices, the frequency error being an amount by which a carrier frequency of the received signals differs from a predetermined frequency, and to compensate for the tracked frequency errors during decoding of the received signals.

Paragraph 32. An infrastructure equipment according to Paragraph 31, wherein the infrastructure equipment is configured, during the predetermined period, to transmit a command to the one of the communications devices at a frequency shifted from a preconfigured frequency of transmission of the infrastructure equipment by an amount equal to the frequency error, the command indicating to the one of the communications devices that the frequency of transmissions of the one of the communications devices should be corrected by an amount equal and opposite to the frequency error.

Paragraph 33. An infrastructure equipment according to any of Paragraphs 23 to 32, wherein the infrastructure equipment is configured to detect that a part of the received signals from the one of the communications devices is received in communications resources allocated to one of the other communications devices, to treat the part of the received signals as interference from signals received from the other of the communications devices, and to compensate for the part of the received signals during decoding of the signals received from the other of the communications devices.

Paragraph 34. An infrastructure equipment according to any of Paragraphs 23 to 33, wherein the infrastructure equipment is configured to transmit signals to one or more others of the communications devices during the predetermined period.

Paragraph 35. An infrastructure equipment according to any of Paragraphs 23 to 34, wherein the infrastructure equipment is configured, subsequent to the predetermined period, to transmit an acknowledgement signal to the one of the communications devices.

Paragraph 36. An infrastructure equipment according to any of Paragraphs 23 to 35, wherein the controller is configured to control the receiver to receive uplink signals transmitted from the one of the communications devices in a plurality of transmission periods, one or more of the transmission periods exceeding the predetermined threshold duration for the reception of signals, each of the plurality of transmission periods which exceed the predetermined threshold being separated from a next transmission by the predetermined period in which the one of the communications devices does not transmit for the one of the communications devices to correct a transmission frequency with respect to a carrier frequency of allocated communications resources, and after a last of the transmission periods in which the uplink signals are received from the one of the communications devices, to determine whether the duration of reception of the signals from the one of the communications devices in the last of the transmission periods exceeded the predetermined threshold, and if so to control the transmitter to delay the transmission of downlink signals to the one of the communications devices for the predetermined period.

Paragraph 37. An infrastructure equipment according to Paragraph 36, wherein the second predetermined period is the same as the first predetermined period.

Paragraph 38. A communications device configured to transmit signals to and receive signals from an infrastructure equipment forming part of a mobile communications network, the communications device comprising a receiver configured to receive signals on the downlink from the infrastructure equipment via a wireless access interface of the mobile communications network, a transmitter configured to transmit signals on the uplink to the infrastructure equipment via the wireless access interface, a controller configured to control the receiver to receive the signals and to control the transmitter to transmit the signals, and a reference frequency source configured to control an output frequency of the signals transmitted by the transmitter, wherein the controller is configured in combination with the receiver, the transmitter and the reference frequency source to transmit the signals to the infrastructure equipment in accordance with the controlled output frequency, to determine whether a time taken for the transmission of the signals to the infrastructure equipment exceeded a predetermined threshold, and if so subsequently to synchronise the output frequency to a carrier frequency of the infrastructure equipment during a predetermined period, and to decode, subsequent to the predetermined period, signals received from the infrastructure equipment.

Paragraph 39. A communications device according to Paragraph 37, wherein the communications device is configured, during the predetermined period, to receive a command from the infrastructure equipment at a frequency shifted from a preconfigured frequency of transmission of the infrastructure equipment by an amount equal to the frequency error, and to correct, according to the command, the frequency of transmitted signals by an amount equal and opposite to the frequency error.

Paragraph 40. A communications device according to Paragraph 37 or Paragraph 38, wherein the controller is configured to control the transmitter to transmit uplink signals to the infrastructure equipment in a plurality of transmission periods, one or more of the transmission periods exceeding the predetermined threshold duration for the transmission of signals, each of the plurality of transmission periods which exceed the predetermined threshold being separated from a next transmission by the predetermined period in which the communications device does not transmit, and in which the controller can correct the output frequency for transmitting the signals with respect to the carrier frequency of the infrastructure equipment, and after transmitting the signals in a last of the transmission periods, the controller is configured in combination with the receiver to determine whether the transmission duration in the last transmission period exceeded the predetermined threshold, and if so to control the transmitter to correct the output frequency to the carrier frequency of the infrastructure equipment, and to receive downlink signals from the infrastructure equipment after a delay corresponding to the frequency predetermined period.

Paragraph 41. A communications device as claimed in Paragraph 40, wherein the second predetermined period is the same as the first predetermined period.

Paragraph 42. A method of controlling communications at an infrastructure equipment forming part of a mobile communications network configured to transmit signals to and receive signals from one or more communications devices, the method comprising determining whether a duration of reception of signals from one of the communications devices exceeds a predetermined threshold, and if so subsequently delaying transmission of signals to the one of the communications devices for a predetermined period following the reception of the signals from the one of the communications devices.

Paragraph 43. A method of controlling communications at a communications device configured to transmit signals to and receive signals from an infrastructure equipment forming part of a mobile communications network, the method comprising controlling at a reference frequency source of the communications device an output frequency of signals transmitted by the communications device, transmitting signals to the infrastructure equipment in accordance with the controlled output frequency, determining whether a time taken for the transmission of the signals to the infrastructure equipment exceeded a predetermined threshold, and if so subsequently synchronising the output frequency to a carrier frequency of the infrastructure equipment during a predetermined period, and to decode, subsequent to the predetermined period, signals received from the infrastructure equipment.

Paragraph 44. Circuitry for an infrastructure equipment forming part of a mobile communications network configured to transmit signals to and receive signals from one or more communications devices, the infrastructure equipment comprising a receiver configured to receive signals on the uplink from the one or more communications devices via a wireless access interface of the mobile communications network, a transmitter configured to transmit signals on the downlink to the one or more communications devices via the wireless access interface, and a controller configured to control the receiver to receive the signals and to control the transmitter to transmit the signals, wherein the controller is configured in combination with the receiver and the transmitter
to determine whether a measured duration of reception of signals from one of the communications devices exceeds a predetermined threshold, and if so subsequently
to delay transmission of signals to the one of the communications devices for a predetermined period following the reception of the signals from the one of the communications devices.

Paragraph 45. Circuitry for a communications device configured to transmit signals to and receive signals from an infrastructure equipment forming part of a mobile communications network, the communications device comprising
a receiver configured to receive signals on the downlink from the infrastructure equipment via a wireless access interface of the mobile communications network,
a transmitter configured to transmit signals on the uplink to the infrastructure equipment via the wireless access interface,
a controller configured to control the receiver to receive the signals and to control the transmitter to transmit the signals, and
a reference frequency source configured to control an output frequency of the signals transmitted by the transmitter, wherein the controller is configured in combination with the receiver, the transmitter and the reference frequency source
to transmit the signals to the infrastructure equipment in accordance with the controlled output frequency,
to determine whether a time taken for the transmission of the signals to the infrastructure equipment exceeded a predetermined threshold, and if so, subsequently
to synchronise the output frequency to a carrier frequency of the infrastructure equipment during a predetermined period, and
to decode, subsequent to the predetermined period, signals received from the infrastructure equipment.

Paragraph 46. An infrastructure equipment forming part of a mobile communications network configured to transmit signals to and receive signals from one or more communications devices, the infrastructure equipment comprising
a receiver configured to receive signals on the uplink from the one or more communications devices via a wireless access interface of the mobile communications network,
a transmitter configured to transmit signals on the downlink to the one or more communications devices via the wireless access interface, and
a controller configured to control the receiver to receive the signals and to control the transmitter to transmit the signals, wherein the controller is configured in combination with the receiver and the transmitter
to receive uplink signals transmitted from one of the communications devices in a plurality of transmission periods, each of the plurality of transmission periods being separated from a next transmission by a first predetermined period in which the one of the communications devices receives downlink signals from the infrastructure equipment to correct a transmission frequency with respect to a carrier frequency of allocated communications resources, and
after a last of the transmission periods in which the uplink signals are received from the one of the communications devices, to determine whether the duration of reception of the signals from the one of the communications devices in the last of the transmission periods exceeded the predetermined threshold, and if so to control the transmitter to delay transmission of signals to the one of the communications devices for a second predetermined period following the reception of the signals from the one of the communications devices.

Paragraph 47. A communications device configured to transmit signals to and receive signals from an infrastructure equipment forming part of a mobile communications network, the communications device comprising
a receiver configured to receive signals on the downlink from the infrastructure equipment via a wireless access interface of the mobile communications network,
a transmitter configured to transmit signals on the uplink to the infrastructure equipment via the wireless access interface,
a controller configured to control the receiver to receive the signals and to control the transmitter to transmit the signals, and
a reference frequency source configured to control an output frequency of the signals transmitted by the transmitter, wherein the controller is configured in combination with the receiver, the transmitter and the reference frequency source
to transmit the signals to the infrastructure equipment in accordance with the controlled output frequency in a plurality of transmission periods, each of the plurality of transmission periods being separated from a next transmission by a first predetermined period in which the communications device receives downlink signals from the infrastructure equipment, and in which the controller can correct the output frequency for transmitting the signals with respect to a carrier frequency of the infrastructure equipment, and after transmitting the signals in a last of the transmission periods,
to determine whether the transmission duration in the last transmission period exceeded the predetermined threshold, and if so subsequently
to correct the output frequency to the carrier frequency of the infrastructure equipment during a second predetermined period, and
to decode, subsequent to the second predetermined period, signals received from the infrastructure equipment.

Paragraph 48. A method of controlling communications at an infrastructure equipment forming part of a mobile communications network configured to transmit signals to and receive signals from one or more communications devices, the method comprising
receiving via a wireless access interface of the mobile communications network uplink signals transmitted from one of the communications devices in a plurality of transmission periods, each of the plurality of transmission periods being separated from a next transmission by a first predetermined period in which the one of the communications devices receives downlink signals from the infrastructure equipment to correct a transmission frequency with respect to a carrier frequency of allocated communications resources, and after a last of the transmission periods in which the uplink signals are received from the one of the communications devices,
determining whether the duration of reception of the signals from the one of the communications devices in the last of the transmission periods exceeded the predetermined threshold, and if so
delaying transmission of signals to the one of the communications devices for a second predetermined period following the reception of the signals from the one of the communications devices.

Paragraph 49. A method of controlling communications at a communications device configured to transmit signals to and receive signals from an infrastructure equipment forming part of a mobile communications network, the method comprising transmitting via a wifeless access interface of the mobile communications network the signals to the infrastructure equipment in accordance with a controlled output frequency in a plurality of transmission periods, each of the plurality of transmission periods being separated from a next transmission by a first predetermined period in which the communications device receives downlink signals from the infrastructure equipment, and in which the communications device can correct the output frequency for transmitting the signals with respect to a carrier frequency of the infrastructure equipment, and after transmitting the signals in a last of the transmission periods, determining whether the transmission duration in the last transmission period exceeded the predetermined threshold, and if so subsequently correcting the output frequency to the carrier frequency of the infrastructure equipment during a second predetermined period, and decoding, subsequent to the second predetermined period, signals received from the infrastructure equipment.

Paragraph 50. Circuitry for an infrastructure equipment forming part of a mobile communications network configured to transmit signals to and receive signals from one or more communications devices, the infrastructure equipment comprising a receiver configured to receive signals on the uplink from the one or more communications devices via a wireless access interface of the mobile communications network, a transmitter configured to transmit signals on the downlink to the one or more communications devices via the wireless access interface, and a controller configured to control the receiver to receive the signals and to control the transmitter to transmit the signals, wherein the controller is configured in combination with the receiver and the transmitter to receive uplink signals transmitted from one of the communications devices in a plurality of transmission periods, each of the plurality of transmission periods being separated from a next transmission by a first predetermined period in which the one of the communications devices receives downlink signals from the infrastructure equipment to correct a transmission frequency with respect to a carrier frequency of allocated communications resources, and after a last of the transmission periods in which the uplink signals are received from the one of the communications devices, to determine whether the duration of reception of the signals from the one of the communications devices in the last of the transmission periods exceeded the predetermined threshold, and if so to control the transmitter to delay transmission of signals to the one of the communications devices for a second predetermined period following the reception of the signals from the one of the communications devices.

Paragraph 51. Circuitry for a communications device configured to transmit signals to and receive signals from an infrastructure equipment forming part of a mobile communications network, the communications device comprising a receiver configured to receive signals on the downlink from the infrastructure equipment via a wireless access interface of the mobile communications network, a transmitter configured to transmit signals on the uplink to the infrastructure equipment via the wireless access interface, a controller configured to control the receiver to receive the signals and to control the transmitter to transmit the signals, and a reference frequency source configured to control an output frequency of the signals transmitted by the transmitter, wherein the controller is configured in combination with the receiver, the transmitter and the reference frequency source to transmit the signals to the infrastructure equipment in accordance with the controlled output frequency in a plurality of transmission periods, each of the plurality of transmission periods being separated from a next transmission by a first predetermined period in which the communications device receives downlink signals from the infrastructure equipment, and in which the controller can correct the output frequency for transmitting the signals with respect to a carrier frequency of the infrastructure equipment, and after transmitting the signals in a last of the transmission periods, to determine whether the transmission duration in the last transmission period exceeded the predetermined threshold, and if so subsequently to correct the output frequency to the carrier frequency of the infrastructure equipment during a second predetermined period, and to decode, subsequent to the second predetermined period, signals received from the infrastructure equipment.

Paragraph 52. A communications device configured to transmit signals to and receive signals from an infrastructure equipment forming part of a mobile communications network, the communications device comprising a receiver configured to receive signals on the downlink from the infrastructure equipment via a wireless access interface of the mobile communications network, a transmitter configured to transmit signals on the uplink to the infrastructure equipment via the wireless access interface, a controller configured to control the receiver to receive the signals and to control the transmitter to transmit the signals, and a reference frequency source configured to control an output frequency of the signals transmitted by the transmitter, wherein the controller is configured in combination with the receiver, the transmitter and the reference frequency source to receive from the infrastructure equipment an indication of communications resources in which the transmitter can transmit signals to the infrastructure equipment, to determine whether a period required to transmit an uplink transmission to the infrastructure equipment in the indicated communications resources exceeds a predetermined threshold, and if so, subsequently to control the transmitter not to transmit signals to the infrastructure equipment using the indicated communications resources.

Paragraph 53. A communications device according to paragraph 52, wherein if the period required to transmit the uplink transmission to the infrastructure equipment exceeds the predetermined threshold, to search for a second infrastructure equipment to which the uplink transmission can be transmitted.

Paragraph 54. A communications device according to Paragraph 52 or Paragraph 53, wherein the communications device determines the period required to transmit the uplink transmission to the infrastructure equipment based on a coverage level of the communications device.

Paragraph 55. A communications device according to any of Paragraphs 52 to 54, wherein the reference frequency source has a predetermined accuracy relating to an amount of frequency drift of the output frequency with respect to time, and if the period required to transmit the uplink transmission to the infrastructure equipment exceeds the predetermined threshold, the controller is configured in combination with the receiver, the transmitter and the reference frequency source to determine that the amount of frequency drift caused by the reference frequency source with the predetermined accuracy is within a predetermined limit, and to control the transmitter and the receiver to transmit signals to and to receive signals from the infrastructure equipment.

Paragraph 56. A communications device configured to transmit signals to and receive signals from infrastructure equipment forming part of a mobile communications network, the communications device comprising a receiver configured to receive signals on the downlink from a first infrastructure equipment via a wireless access interface of the mobile communications network, a transmitter configured to transmit signals on the uplink to the first infrastructure equipment via the wireless access interface, a controller configured to control the receiver to receive the signals and to control the transmitter to transmit the signals, and a reference frequency source configured to control an output frequency of the signals transmitted by the transmitter, wherein the controller is configured in combination with the receiver, the transmitter and the reference frequency source to receive from the first infrastructure equipment an indication of communications resources in which the transmitter can transmit signals to the infrastructure equipment, to determine whether a period required to transmit an uplink transmission to the first infrastructure equipment in the indicated communications resources exceeds a predetermined threshold, and if so, to search for a second infrastructure equipment to which the uplink transmission can be transmitted, and to control the transmitter to transmit signals to the second infrastructure equipment on second communications resources indicated by the second infrastructure equipment rather than using the indicated communications resources of the first infrastructure equipment.

Paragraph 57. A method of controlling communications at a communications device configured to transmit signals to and receive signals from an infrastructure equipment forming part of a mobile communications network, the method comprising receiving from the infrastructure equipment an indication of communications resources in which the communications device can transmit signals to the infrastructure equipment, determining whether a period required to transmit an uplink transmission to the infrastructure equipment in the indicated communications resources exceeds a predetermined threshold, and if so, subsequently controlling the communications device not to transmit signals to the infrastructure equipment using the indicated communications resources.

Paragraph 58. Circuitry for a communications device configured to transmit signals to and receive signals from an infrastructure equipment forming part of a mobile communications network, the communications device comprising a receiver configured to receive signals on the downlink from the infrastructure equipment via a wireless access interface of the mobile communications network, a transmitter configured to transmit signals on the uplink to the infrastructure equipment via the wireless access interface, a controller configured to control the receiver to receive the signals and to control the transmitter to transmit the signals, and a reference frequency source configured to control an output frequency of the signals transmitted by the transmitter, wherein the controller is configured in combination with the receiver, the transmitter and the reference frequency source to receive from the infrastructure equipment an indication of communications resources in which the transmitter can transmit signals to the infrastructure equipment, to determine whether a period required to transmit an uplink transmission to the infrastructure equipment in the indicated communications resources exceeds a predetermined threshold, and if so, subsequently to control the transmitter not to transmit signals to the infrastructure equipment using the indicated communications resources.

Paragraph 59. A method of controlling communications at a communications device configured to transmit signals to and receive signals from infrastructure equipment forming part of a mobile communications network, the method comprising receiving from a first infrastructure equipment an indication of communications resources in which the communications device can transmit signals to the infrastructure equipment, determining whether a period required to transmit an uplink transmission to the first infrastructure equipment in the indicated communications resources exceeds a predetermined threshold, and if so, searching for a second infrastructure equipment to which the uplink transmission can be transmitted, and transmitting to the second infrastructure equipment on second communications resources indicated by the second infrastructure equipment rather than using the indicated communications resources of the first infrastructure equipment.

Paragraph 60. Circuitry for a communications device configured to transmit signals to and receive signals from infrastructure equipment forming part of a mobile communications network, the communications device comprising a receiver configured to receive signals on the downlink from a first infrastructure equipment via a wireless access interface of the mobile communications network, a transmitter configured to transmit signals on the uplink to the first infrastructure equipment via the wireless access interface, a controller configured to control the receiver to receive the signals and to control the transmitter to transmit the signals, and a reference frequency source configured to control an output frequency of the signals transmitted by the transmitter, wherein the controller is configured in combination with the receiver, the transmitter and the reference frequency source to receive from the first infrastructure equipment an indication of communications resources in which the transmitter can transmit signals to the infrastructure equipment, to determine whether a period required to transmit an uplink transmission to the first infrastructure equipment in the indicated communications resources exceeds a predetermined threshold, and if so, to search for a second infrastructure equipment to which the uplink transmission can be transmitted, and to control the transmitter to transmit signals to the second infrastructure equipment on second communications resources indicated by the second infrastructure equipment rather than using the indicated communications resources of the first infrastructure equipment.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

ANNEX 1

The simplified structure of the downlink of an LTE wireless access interface presented in FIG. 2, also includes an illustration of each subframe 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel PDCCH, a physical control format indicator channel PCFICH and a physical HARQ indicator channel PHICH. The data region may contain a number of physical channel for the transmission of data, such as a physical downlink shared channel PDSCH and a physical broadcast channels PBCH. Although these physical channels provide a wide range of functionality to LTE systems, in terms of resource allocation and the present disclosure PDCCH and PDSCH are most relevant. Further information on the structure and functioning of the physical channels of LTE systems can be found in [1].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control RRC signaling. In FIG. 2, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resources, resource control information specifying downlink resource allocations is conveyed across the PDCCH in a form termed downlink control information DCI, where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Each uplink subframe may include a plurality of different channels, for example a physical uplink shared channel PUSCH 305, a physical uplink control channel PUCCH 306, and a physical random access channel PRACH. The physical Uplink Control Channel PUCCH may carry control information such as ACK/NACK to the eNodeB for downlink transmissions, scheduling request indicators SRI for UEs wishing to be scheduled uplink resources, and feedback of downlink channel state information CSI for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signaled to UE in downlink signaling such as system information blocks. As well as physical uplink channels, uplink subframes may also include reference signals. For example, demodulation reference signals DMRS 307 and sounding reference signals SRS 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information UCI on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

REFERENCES

[1] LTE for UMTS: OFDMA and SC-FDM A Based Radio Access, Harris Holma and Antti Toskala, Wiley 2009, ISBN 978-0-470-99401-6.

[2] RP-151621, "New Work Item: NarrowBand IOT NB-IOT," Qualcomm, RAN#69
[3] R1-157783, "Way Forward on NB-IoT," CMCC, Vodafone, Ericsson, Huawei, HiSilicon, Deutsche Telekom, Mediatek, Qualcomm, Nokia Networks, Samsung, Intel, Neul, CATR, AT&T, NTT DOCOMO, ZTE, Telecom Italia, IITH, CEWiT, Reliance-Jio, CATT, u-blox, China Unicom, LG Electronics, Panasonic, Alcatel-Lucent, Alcatel-Lucent Shanghai Bell, China Telecom, RAN1#83

What is claimed is:

1. A communication device, comprising:
a receiver configured to receive, from an infrastructure equipment of a mobile communications network, downlink signals on a downlink via a wireless access interface of the mobile communications network;
a transmitter configured to transmit, to the infrastructure equipment, uplink signals on an uplink via the wireless access interface; and
a control circuit configured to:
control the receiver to receive the downlink signals;
control the transmitter to transmit the uplink signals;
delay a reception period for a predetermined frequency adjustment period after a transmission period in which a duration of the transmitter transmitting the uplink signals exceeds a predetermined threshold, wherein the reception period corresponds to a reception of the downlink signals from the infrastructure equipment and
in response to a determination that the downlink signals have not been received from the infrastructure equipment for longer than the predetermined frequency adjustment period, synchronize an output frequency of the transmitter to a carrier frequency of the infrastructure equipment based on a synchronization signal received from the infrastructure equipment.

2. The communication device according to claim 1, wherein the control circuit is configured to
determine whether the duration of the transmission period exceeds the predetermined threshold, and
delay the reception period when the control circuit determines that the duration of the transmission period exceeds the predetermined threshold.

3. The communication device according to claim 1, wherein the infrastructure equipment is configured to determine whether the duration of the transmission period exceeds the predetermined threshold.

4. The communication device according to claim 1, wherein when the control circuit delays the reception, the control circuit inserts transmission gaps into the uplink signals transmitted by the transmitter.

5. The communication device according to claim 1, wherein when the control circuit delays the reception, the control circuit delays the reception period by a length of time that is dependent on a capability of the communication device.

6. The communication device according to claim 1, wherein when the control circuit is configured to delay the reception period, the control circuit delays the reception period a length of time that is assigned in system information block (SIB) signaling.

7. The communication device according to claim 1, wherein when the control circuit is configured to delay the reception period, the control circuit is configured to control the transmitter to transmit a synchronization signal to the infrastructure equipment.

8. The communication device according to claim 1, wherein when the control circuit is configured to delay the reception period, the control circuit is configured to control the receiver to receive, after the reception period is delayed, an acknowledgement signal from the infrastructure equipment.

9. The communication device according to claim 1, wherein when the control circuit is configured to delay the reception period, the control circuit is configured to
synchronize the output frequency of the transmitter to the carrier frequency of the infrastructure equipment during the predetermined frequency adjustment period, and
after conclusion of the predetermined frequency adjustment period, decode the downlink signals received by the receiver from the infrastructure equipment during the reception period.

10. A communication device, comprising:
processing circuitry configured to
transmit, to an infrastructure equipment of a mobile communications network, uplink signals on an uplink via a wireless access interface of the mobile communications network;
receive, from the infrastructure equipment, downlink signals on a downlink via the wireless access interface;
delay a reception period for a predetermined frequency adjustment period after a transmission period in which a duration of transmitting the uplink signals exceeds a predetermined threshold, wherein the reception period corresponds to a reception of the downlink signals from the infrastructure equipment and
in response to a determination that the downlink signals have not been received from the infrastructure equipment for longer than the predetermined frequency adjustment period, synchronize an output frequency of the transmitter to a carrier frequency of the infrastructure equipment based on a synchronization signal received from the infrastructure equipment.

11. The communication device according to claim 10, wherein the processing circuitry is configured to
determine whether the duration of the transmission period exceeds the predetermined threshold, and
delay the reception period when the processing circuitry determines that the duration of the transmission period exceeds the predetermined threshold.

12. The communication device according to claim 10, wherein the infrastructure equipment is configured to determine whether the duration of the transmission period exceeds the predetermined threshold.

13. The communication device according to claim 10, wherein when the processing circuitry delays the reception period, the processing circuitry inserts transmission gaps into the uplink signals transmitted to the infrastructure equipment.

14. The communication device according to claim 10, wherein when the processing circuitry delays the reception period, the processing circuitry is configured to delays the reception period by a length of time that is dependent on a capability of the communication device.

15. The communication device according to claim 10, wherein when the processing circuitry delays the reception period, the processing circuitry delays the reception period by a length of time that is assigned in system information block (SIB) signaling.

16. The communication device according to claim 10, wherein when the processing circuitry delays the reception period, the processing circuitry is configured to transmit a synchronization signal to the infrastructure equipment.

17. The communication device according to claim 10, wherein when the processing circuitry delays the reception period, the processing circuitry is configured to
synchronize the output frequency of the transmitter to the carrier frequency of the infrastructure equipment during the predetermined frequency adjustment period, and
after conclusion of the predetermined frequency adjustment period, decode the downlink signals received from the infrastructure equipment during the reception period.

18. A communication method, comprising:
transmitting, by processing circuitry of a communication device to an infrastructure equipment of a mobile communications network, uplink signals on an uplink via a wireless access interface of the mobile communications network;
receiving, from the infrastructure equipment, downlink signals on a downlink via the wireless access interface;
delaying, by the processing circuitry, a reception period for a predetermined frequency adjustment period after a transmission period in which a duration of transmitting the uplink signals exceeds a predetermined threshold, wherein the reception period corresponds to a reception of the downlink signals from the infrastructure equipment and
in response to a determination that the downlink signals have not been received from the infrastructure equipment for longer than the predetermined frequency adjustment period, synchronizing an output frequency of the transmitter to a carrier frequency of the infrastructure equipment based on a synchronization signal received from the infrastructure equipment.

* * * * *